United States Patent [19]
Burt et al.

[11] Patent Number: 5,682,482
[45] Date of Patent: Oct. 28, 1997

[54] FACILITATING THE SUPPLYING OF SERVICES IN A NETWORK

[75] Inventors: Donald V. Burt; Robert M. Lund, both of Boulder, Colo.

[73] Assignee: Probita Inc., Boulder, Colo.

[21] Appl. No.: 557,697

[22] Filed: Nov. 13, 1995

Related U.S. Application Data

[63] Continuation of Ser. No. 224,857, Apr. 8, 1994, abandoned.
[51] Int. Cl.$^6$ ................................................. G06F 17/60
[52] U.S. Cl. ........................................................ 395/242
[58] Field of Search ........................... 395/205, 226, 395/227, 235, 237, 239, 242, 208, 230

[56] References Cited

U.S. PATENT DOCUMENTS

| | | | |
|---|---|---|---|
| 4,656,623 | 4/1987 | Dalby, Jr. et al. ........................ | 370/60 |
| 4,799,156 | 1/1989 | Shavit et al. ............................ | 364/401 |
| 4,897,867 | 1/1990 | Foster et al. ............................ | 379/94 |
| 4,949,248 | 8/1990 | Caro ........................................ | 364/401 |
| 5,262,942 | 11/1993 | Earle ....................................... | 364/408 |
| 5,329,589 | 7/1994 | Fraser et al. ............................ | 364/401 |

*Primary Examiner*—Donald E. McElheny, Jr.
*Attorney, Agent, or Firm*—Sheridan Ross P.C.

[57] ABSTRACT

A network architecture is provided for enhanced support of network services. The architecture includes an operations gateway defined by a number of agents that take responsibility for accomplishing support system related functions including financial transaction functions. Messages are conveyed to the agents that have informational elements containing data or other information useful in accomplishing the necessary functions. Preferably, the network is defined to comprise one or more layers including a service layer, a service instance layer, a connection layer and a connection instance layer. Each layer has associated with it one or more management, fulfillment, charging and booking agents. The operations gateway enables service providers to rapidly introduce new services while optimizing the interchangeability of system components or equipment that are useful in supporting the network services.

30 Claims, 12 Drawing Sheets

FACILITATING THE SUPPLYING OF SERVICES IN A NETWORK

This is a file wrapper continuation of application Ser. No. 08/224,857, filed on Apr. 8, 1994 abandoned.

FIELD OF THE INVENTION

The invention relates to an architecture for managing and supporting the operations of a network, specifically a method for analysis and development of systems required for network management, for the billing of services, and customer support. These techniques will be particularly useful for structuring dynamic support systems required for the operations of current and future communications networks.

BACKGROUND OF THE INVENTION

Within the communications industry what is commonly termed "operational support systems" ("OSS") are the systems that enable the provision of service to customers, the billing for such service, and the support of customers. Cable television and telephone systems are two examples of communication networks. Each offers services to users of the network. Such services currently include the delivery of video and voice signals, digital data delivery, and voice messaging and retrieval services. The processes required to deploy and deliver these services, and others, are numerous and in some cases very involved.

Customers who want to obtain such communication services must be able to order the appropriate services. The service providers must be able to configure the necessary equipment, make the necessary connections, and allow the information to flow from the source to its destination. Network equipment such as telephone switching equipment, signal amplifiers, encoders and decoders, connections over lengths of cable must be installed, configured, switched from one state to another, inventoried, etc. If customers experience any problems, they need to be able to request the repair of the service. Orders for installation of services or repair must be processed and carried out. The services provided must be rated and billed to the client. Revenue received must be allocated or distributed to the provider of the network, the provider of the information and to other companies involved.

To allow for the operations of such networks, communications companies employ OSS's. Such systems are typically proprietary to the service applications and vendors' equipment that they support. OSS's tend to support predetermined services offered through specific network equipment. For example, voice messaging and retrieval, a particular communications application, may be supported by an OSS designed specifically to support the operations involved in delivering such service. That OSS may not necessarily be capable of supporting operations for other particular service applications such as call waiting or call forwarding.

Since OSS's are equipment and applications specific, when new applications or new technology become available, either a new OSS must be developed for each new service or technology or the current OSS must be redesigned to accommodate the new application or new technology. Such changes are expensive and time consuming. These difficulties can delay or forestall the offering of the service. Only in rare instances can a new service be accommodated by an existing OSS without requiring expensive changes.

When multiple companies are involved in the delivery of a service, close coordination must occur to ensure that these processes are properly executed. The problem becomes more apparent and pronounced when services span multiple enterprises, such as a billing company serving a cable television company. In this case, in order to support the necessary processes, a high level of coordination and cooperation is required between the two companies. The companies must exchange data to bill for the service, to control the network and to provide support to the customers. Such coordination and cooperation is required because there are no well accepted or standard interfaces between different companies' systems. This coordination is time consuming and expensive so the enterprises involved are loathe to alter the service offerings and limits the competition around such relationships. This also further limits the offering of new services.

Communication companies offer many types of service applications to their customers. Because of the application specific nature of current OSS's, companies which offer multiple services have multiple operations systems that are not integrated with one another. This causes personnel to have to be trained on a number of systems and the cost of supporting the service offerings is substantially increased because of the need for such multiple OSS's. Furthermore, often times data that is necessary for the support of one application is also necessary for another. Thus, such data is duplicated because of the lack of integration and interoperability among such systems. Such duplication is wasteful and expensive and causes operational problems when the duplicative data becomes inconsistent.

The current architecture for support systems which manage and support the operations of communication networks, specifically the method for facilitating the development of systems necessary for the operations of a network, do not offer any solutions to the above problems. Participants in the communications industry recognize this problem as new applications and technology are continually being proposed and developed. Indeed, the environment of the communications industry is changing at unprecedented rates, and the demand for new communication services and technology to support new service applications is growing exponentially.

SUMMARY OF THE INVENTION

The present invention relates to an architecture, methodology and apparatus for analyzing, developing, and implementing systems required for network management, the billing of services, and customer support. The invention facilitates the supplying of services offered by a network by providing a structure for the development of dynamic support systems required for communications networks. It allows for the rapid introduction of new technology and new service applications by reducing the need for development of new support systems. The invention also reduces the cost of developing and operating support systems.

The invention accomplishes this by: establishing a model that represents all networks, including communications networks, and services provided by such networks; separating the operations functions in the support systems necessary for the support of the operations of the network from the physical components that actually deliver the service; implementing a system of standard interfaces for purposes of network management, billing functions, and service fulfillment; allowing for support systems that are technology and service application independent; permitting interoperability between systems that support different applications and interoperability between components of systems supplied by different vendors; standardizing the data and data formats necessary for initiating and implementing operations functions thereby reducing duplicate information necessary for the operations support systems; reducing the number of systems that operations support personnel need to be trained upon; permitting coordination and cooperation among service and network providers for delivery of new services and new technology.

The functions of the invention are preferably implemented by: defining layers that include a service layer, a service instance layer, a connection layer, and a connection instance layer; establishing an operations gateway comprised of one or more agents which constitute a defined interface which takes responsibility for accomplishment of desired support functions for the operations of a network upon receipt of a message from a sender; providing for defined messages comprised of defined informational elements, which messages are sent by at least one sender to at least one agent, including at least one message associated with at least one service, for the purpose of having the agent initiate the necessary functions by appropriate agent systems; having the senders be agents, agent systems, and network systems; having such operation functions performed by agent systems, which systems are invoked by the agents; not having agents perform any of the operations functions; having one or more agents which include management agents, fulfillment agents, charging agents, and booking agents; having one or more agent systems for performing the management of the service, fulfillment of the service, the charging of the service and the booking of the service; having the agents take responsibility for invoking agent systems in one or more of the defined layers in the communications network.

In performing functions, management agents associated with one or more of the service, service instance, connection and connection instance layers receive messages having informational elements that contain data or other information necessary for the agents to take responsibility for accomplishing the management related functions. Among other responsibilities, the management agents are responsible for invoking appropriate fulfillment agents and charging agents. The fulfillment agents are responsible for fulfilling the desired function or functions associated with a particular layer, such as fulfilling the particular service instance and providing the necessary network connection or connections for delivery of the service instance. In one application, the service instance relates to the delivery of a specific movie pursuant to a video on demand service. The charging agents take responsibility for determining an amount, such as an amount related to the cost of providing network connections and/or the delivery of the particular service instance. The charging agents also are responsible for invoking appropriate booking agents, which take responsibility for debiting and/or crediting proper accounts using the amount.

When a new service is to be provided in the network of the present invention, the agent interface acts to support this new service. In conjunction with the financial transaction supporting system, for example, the management, fulfillment, charging and booking agents, are available for receiving messages from new and/or existing agent systems and/or network systems in order to assume responsibility for the accomplishment of the support functions for this new service. A new financial transaction support system need not be designed and integrated with the new service.

In a related embodiment, the operations gateway is configured to take on responsibility for only a single support system, such as the financial transaction support system. In this embodiment, agents are employed that are equivalent to management, fulfillment, charging and booking agents found in the above-described network embodiment. This agent interface is able to assume responsibility for billing functions required by a variety of providers of services, as well as providers of goods. Since equivalent agents are utilized, just as with the previously described network embodiment, the supplying of new goods and services would be readily handled by the operations gateway. Furthermore, new and/or substitutable systems required to accomplish the functions and/or send messages could be readily integrated with the operations gateway.

DETAILED DESCRIPTION

Figure 1:
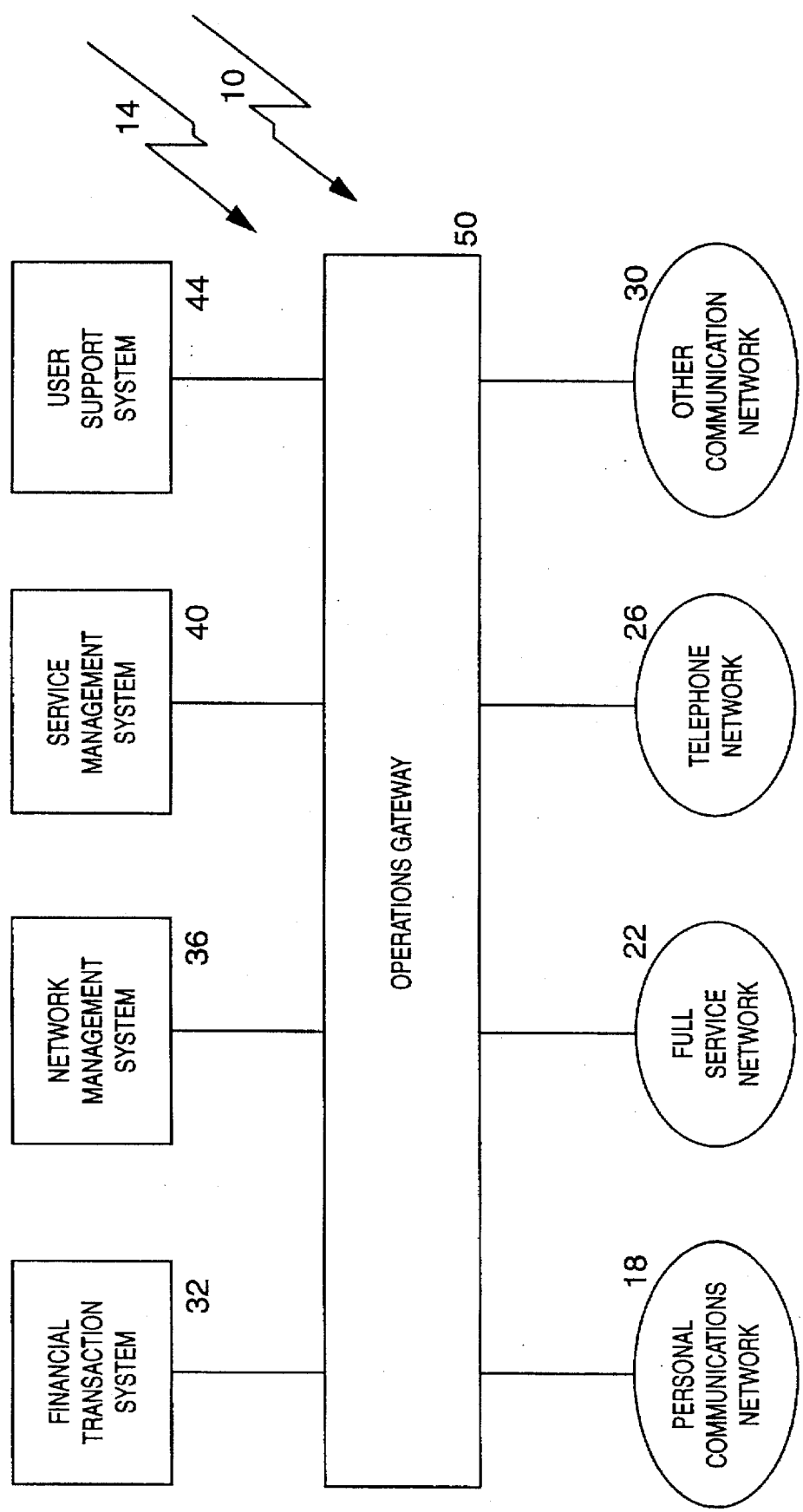
FIG. 1 is a block diagram illustrating the operations gateway and the network, which includes a number of support systems and subnetworks that communicate with the operations gateway.

In accordance with a preferred embodiment of the present invention, as illustrated in FIG. 1, a network 10 is provided that includes a number of support systems 14. The network 10 is used in providing a variety of services and can be defined as including, for example, such networks as a personal communications network 18, a full service network 22, a telephone network 26 and/or other present/future communication networks 30. The personal communications network 18 provides desired communications among a plurality of users linked together by the network. The full service network 22 provides a plurality of available services to users on the network. The telephone network 26 provides voice communication or other data services to users of the network. The services are delivered using the network 10 by a multitude of service providers to one or more users or customers that request any such service. Typically, these networks 18–30 comprise a number of hardware components or equipment, software, operations support systems and other systems that are required for proper operation of the network (collectively and individually referred to as "network systems"). Such network systems are utilized in providing presently defined services and at least some of which are expected to be useful in providing future and not yet defined services over the network 10.

The support systems 14 that support the network 10 include a financial transaction system 32, a network management system 36, a service management system 40 and a user support system 44. The financial transaction system 32 handles financial tasks including charging and booking functions related to services that are provided by the network 10. The network management system 36 manages functions that are to be accomplished by the network 10, particularly as such network functions relate to the providing of the services. The service management system 40 coordinates and organizes the plurality of services that are available on the network 10. The user support system 44 manages or handles tasks associated with supporting customers or other users of the network 10.

Essential to the present invention is an operations gateway 50 that interfaces with the networks 18–30 and the support systems 14. The operations gateway 50 responds to a predetermined protocol in taking responsibility for functions that need to be accomplished in order to support the providing of services by the network 10. The operations gateway 50 receives information and/or data from the network 10 that enable it to respond in a manner that results in the accomplishment of the desired functions. These functions include, for example, managing relationships between service providers and service users, fulfilling service instances, determining an amount to be billed for a specific service instance and crediting and/or debiting an account related to a particular service instance. The accomplishment of these functions is achieved primarily by means of the financial transaction system 32 and other agent and network systems. It should be appreciated, however, that these are only representative functions for the system 32 and further and/or other appropriate functions can be accomplished by the system 32, as well as further and/or other functions appropriate to systems 36–44.

Figure 2:
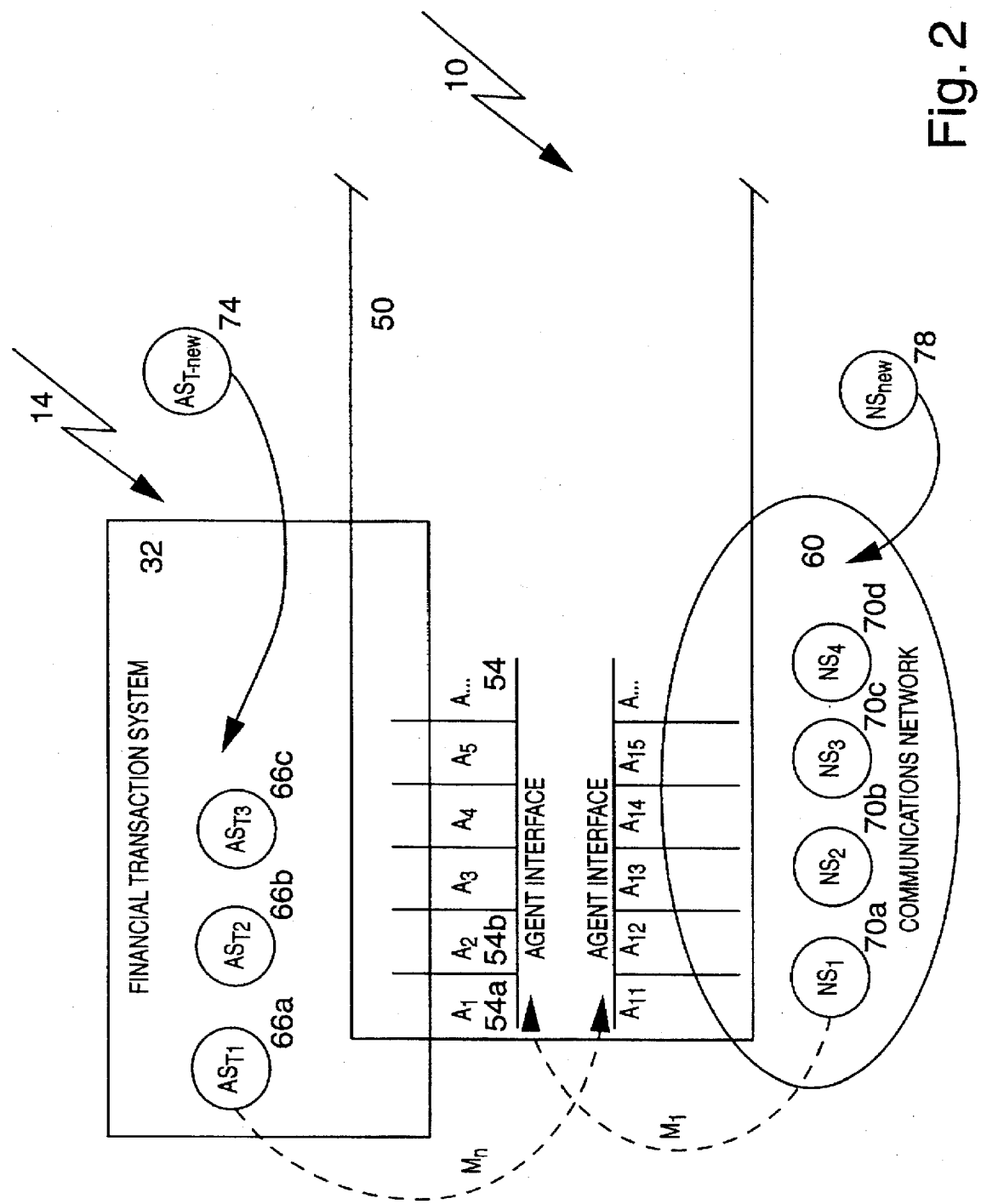
FIG. 2 is a block diagram illustrating more detailed aspects of the operations gateway and a communications network including a number of agents that make up the agent interface, and a number of agent systems, network systems and message paths.

With reference to FIG. 2, the operations gateway 50 is further described as it relates particularly to the financial transaction system 32, although it should be understood that a similar description applies to the other support systems 36–44. The operations gateway 50 includes a number of agents 54, such as agents $A_1, A_2 \ldots A_{11}, A_{12} \ldots$ The agents 54 together constitute an agent interface 58 through which necessary and appropriate communications occur involving the financial transaction system 32 and a communications network 60, with the communications network 60 being representative of one or more of a number of networks or subnetworks that are part of the network 10 and are useful in providing available services. Although the operations gateway 50 shown in FIG. 2 illustrates a division or separation to more than one agent interface, it should be appreciated that there is, generally speaking, a single interface that defines the plurality of agents' interfaces that are required for implementing the functions associated with the financial transaction system 32 of the support systems 14. Each of the agents 54 takes responsibility for the accomplishment of one or more desired functions. None of the agents performs any of the functions for which it takes responsibility. With regard to the accomplishment of the necessary or appropriate functions, the financial transaction system 32 includes a plurality of agent systems 66 including agent systems 66a, 66b, 66c, with each of these agent systems being identified as $AS_{T1}, AS_{T2}, AS_{T3}$, respectively. Each of the agent systems 66 accomplishes one or more of the functions initiated by an agent 54. For example, the agent system 66a may accomplish functions initiated by the agent 54a and the agent systems 66b, 66c may accomplish functions initiated by the agent 54b. The agent systems 66 typically include, for example, computer equipment or components, such as computer processing hardware, computer peripheral hardware and computer software that are involved in accomplishing the afore-noted financial-related functions.

With respect to achieving the communication that is required for the agent interface 58 and its associated agents 54 in conjunction with taking on the responsibility for accomplishing the functions, messages are sent or inputted to the agent interface 58 by message senders. Each message includes common information. In particular, each message can be defined as including a number of informational elements that include data and/or other information useful in implementing the functions. In the context of financial transaction related functions, such informational elements may include service request information, service instance request information and connection request information that relate to a service to be supplied by a provider to a user and how a particular service instance is to be charged. Other informational elements may contain booking data describing a particular booking to be used for a user or a provider, fulfillment agent data describing a fulfillment agent to be used for fulfilling a request, charging agent data describing a charging agent to be used in charging an amount associated with a request, description data describing a particular request and/or accounting rules used in determining an amount to charge. Informational elements that are more general or more common among a plurality of messages include: an identification of a user of a particular service, an identification of a provider of the particular service, a type of information that is related to the particular service, such as a voice communication service or a video on demand service, and a session_id that describes the particular service, such as the providing of an identified movie.

In the preferred embodiment, only the agent interface 58 receives the messages. The messages can be sent by a plurality of senders including agent systems 66, one or more of the agents 54 themselves and network systems 70. The network systems 70 include network equipment and/or components, such as computer equipment, computer software, interconnecting cables and/or switches that are involved in providing services available over the network 10. In the context of the communications network 60, such network systems include network systems 70a, 70b, 70c, 70d and which are also identified as $NS_1, NS_2, NS_3, NS_4$, respectively. These network systems 70 typically act as senders of messages to the agent interface 58, as part of the delivery of network services. In the case of the financial transaction system 32, an initial message $M_1$ may be sent by the network system 70a ($NS_1$) related to billing for a particular service. The message $M_1$ includes the informational elements that are required by the agent interface 58 and conforms to the required message protocol. Generally also, with regard to accomplishing the necessary functions associated with the billing process, the agent system ($AS_{T1}$) may send a message $M_n$ to the agent interface making a further request of the agent interface 58 and a particular agent 54 that is required for taking responsibility for the further one or more necessary functions associated with the billing process.

From the foregoing, the operations gateway 50 enables operations functions, such as financial related functions, to be independent of network elements including network support system elements. That is, the operations gateway 50 enables the network 10 to provide current and future services without any requirement that a network technology be tied to technology of a certain technology supplier or that only a particular network technology be utilized. Instead, the operations gateway 50 permits modular, loosely coupled, multi-vendor distributed computer hardware, computer software and/or other network technology components and equipment to be utilized in providing network services.

More specifically, because the agents 54 take responsibility for accomplishing the necessary functions, it is not material whether one agent system or one network system from a particular vendor is utilized or another agent system or network system from another vendor is utilized, so long as their functions are implemented by such systems and proper communication is established with the operations gateway 50 using messages.

In addition, with continued reference to FIG. 2, the operations gateway 50 permits the market for new services to be developed in that users can be provided with a multiplicity of new services rapidly and inexpensively. Such flexibility is useful for providing individual users and niche market providers with the ability to receive and supply services. In that regard, when a new service is offered that may require at least one new agent system 74 ($AS_{T-new}$), this new agent system 74 can be included as part of the financial transaction system 32 and provided with necessary message capability to communicate with the agent interface 58, in conjunction with providing the new financial transaction related function associated with the new service. Similarly, if the new service requires a new network system 78 ($NS_{new}$), such a network system can be included in the network 10 with the appropriate communication capability with the operations gateway 50 to permit it to send one or more messages for use in accomplishing one or more functions associated with the new service. This flexibility enables the present invention to provide new service-oriented and new support-oriented systems while avoiding vertical integration between the new service (new application for the network) and support systems that are necessary to support the new service. In the case of the financial transaction system 32, the same agent interface 58 is useful in taking responsibility for any new or presently existing financial transaction related function.

The operations gateway 50 also accepts responsibility for handling time requirements. Certain support system functions, including those associated with the financial transaction system 32, have time requirements associated therewith, such as related to accessing and/or updating certain financial transactions at appropriate or required times. For example, timely updating associated with a billing function may be required where a user seeks a particular service and a credit check of the user must be made immediately and rapidly before providing such a service. Relatedly, updating of a billing function may be required as the service is being provided. On the other hand, a different time factor may be applied to a request for the generation of a billing statement, which may be generated at a later time from the providing of the service. Messages may include such a time factor and/or one or more of the agents themselves may be configured to take into account any timing related factor.

The operations gateway 50 by means of the agent interface 58 allows for different enterprises to inter-operate in the network 10, for example, in the billing support capability. By way of example, one consumer may want its transport costs billed separately from its services. Another consumer of the same service may want a consolidated (i.e. transport plus service) bill. A third user of the same service may request a flat rate billing. Relatedly, because service and transport providers may be different organizations, they must be able to coordinate their billing to support possibly different billing policies.

Preferably, in achieving the foregoing, the operations gateway 50 interfaces with a network 10 in accordance with a plurality of defined layers. These layers define a partitioning of the network 10 and, based on this partitioning, flexible management of the network 10 results. In a preferred embodiment, four network layers are defined, namely:

A service layer defines an information model for management of a number of services available from a plurality of providers to a plurality of users. The service layer is involved with services offered as products by providers to users, e.g., video on demand, network games, home shopping.

A service instance layer defines an information model for management of a particular service to a user and requests network connections to provide the particular service. This relates to a particular service instance that is in use, e.g., delivery of a specific movie, playing a game, an interaction on home shopping.

A connection layer defines an information model for management of physical and logical devices and their interconnection within the network. This relates to the physical equipment from which the network is constructed, e.g., converters, fiber, coax, amplifiers, switches, servers, set top boxes, etc.

A connection instance layer defines an information model for management of particular connections in the network 10 that are required to provide available services. This layer relates to basic communication transport and signaling (e.g., ATM AALs, ISDN B channels, OSI 1–4) and computing resources (e.g., operating systems, GUIs, network services, run time libraries).

With reference initially to FIGS. 3A–3D, a more detailed description related to the operations gateway 50 is provided in the context of a general example involving a plurality of agents 54 and the financial transaction system 32. Before proceeding with this description, certain terms are defined that will be utilized in the explanation, namely:

Agents:

MA: management agent—responsible for managing services, particular service instances, network connections or particular network connection_instances (depending upon the network layer).

FA: fulfillment agent—responsible for fulfillment of a service, service instance, network connections or particular network connection_instances (depending upon the network layer).

CA: charging agent—responsible for charging for services, service instances, network connections or network connection_instances (depending upon the network layer).

BA: booking agent—responsible for financial transfers relative to users and providers for services, service instances, network connections or network connection_ instances (depending upon network layer)

In sending information/data to these agents 54, certain informational elements of the messages are also defined, namely:

Session_id—refers to a function or an activity that needs to be accomplished and includes a description thereof with an identifier that uniquely identifies the current session.

User—information related to a general description of a user including, for example, user_booking_agent (a booking description to be used for the user).

Service_user—a specialized description of a particular user used by service and service instance layer agents which includes, for example, a profile of the user for purposes of service control.

Connection_user—a specialized description of a particular user used by connection and connection instance layer agents.

Provider—a general description of a provider including, for example, provider_booking_agent (a booking description to be used for the provider).

Service_provider—a specialization of a provider used by service and service instance layer agents.

Connection_provider—a specialization of a provider used by connection and connection instance layer agents.

Request—a general description of a request for service.

Service_request—a specialization of request used by service layer agents and such a request may include one or more of the following related requests: service_user_booking, service_provider_booking, service_fa (fulfillment agent), service_ca (charging agent), service_description and service_accounting_rules.

Service_instance_request—a specialization of request used by agents in the service instance layer and may include one or more of the following: service_instance_user_booking, service_instance_provider_booking, service_instance_fa (fulfillment agent), service_instance_ca (charging agent), service_instance_description, service_instance_accounting_rules.

Connection_request—a specialization of request used by agents in the connection layer and may include one or more of the following: connection_fa (fulfillment agent), connection_ca (charging agent), connection_description and connection_accounting_rules.

Connection_instance_request—a specialization of request used by agents in the connection layer and may include one or more of the following: connection_user_booking, connection_provider_booking, connection_fa (fulfillment agent), connection_ca (charging agent), connection_description, and connection_accounting_rules.

Service_amount—refers to an amount to be charged for a service.

Service_instance_amount—refers to an amount to be charged for a service instance.

Connection_amount—refers to an amount to be charged for access to and/or use of the connection layer.

Connection_instance_amount—refers to an amount to be charged related to a connection_instance.

Service_resources—refers to resources used in accomplishing one or more functions in the service layer.

Service_instance_resources—refers to resources used in accomplishing one or more functions in the service instance layer.

Connection_resources—refers to resources used in accomplishing one or more functions in the connection layer.

Connection_instance_resources—refers to resources used in accomplishing one or more functions in the connection instance layer.

It should be understood that the foregoing identified messages including informational elements and requests are exemplary only in that further or other of such messages, informational elements and/or requests could be identified and utilized in conjunction with the providing of services including the support for such services. The overall architecture and related structure would, however, remain the same in terms of the implementation and use of the operations gateway 50 including agents 54 and the relationship among such agents 54, agent systems 66 and network systems 70.

Figure 3A:
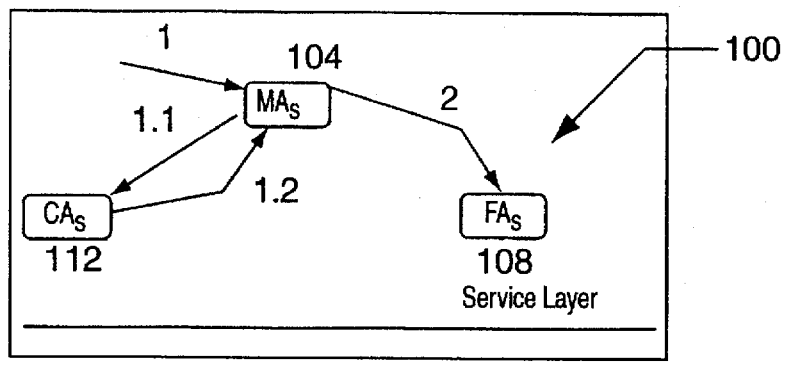
FIGS. 3A–3G schematically illustrate a general application of the operations gateway involving service, service instance, connection and connection instance layers.

With the foregoing nomenclatures and meanings in place, reference is made to FIG. 3A to describe a general application utilizing appropriate agents 54 of the agent interface 58 in conjunction with providing a service to a user. FIG. 3A identifies certain agents 54 with communication paths indicated by lines that represent paths of messages containing data or other information required to provide the service. The agent systems 66 associated with these agents are not specifically illustrated; however, it should be understood that the agents 54 are not responsible for accomplishing the functions while the agent systems 66 associated therewith accomplish the functions, but to simplify the illustration, only the agents 54 themselves are illustrated. It should be appreciated that necessary agent systems 66 are linked to or "in back of" the agents 54 in order to accomplish the identified functions.

With respect to the relevant paths for providing the service, FIG. 3A illustrates a service layer 100 with a number of agents 54 associated therewith including: a management agent 104 for the service layer ($MA_s$); a fulfillment agent 108 for the service layer ($FA_s$); and a charging agent 112 for the service layer ($CA_s$). FIG. 3A also identifies message paths for sending requests to agents, namely: path 1 to $MA_s$ 104 from a user, which request may emanate from a network system 70, for example. In connection with describing what occurs, a message connotation is provided associated with path 1, namely: 1) service_req (session_id, user, provider, service_request). In accordance with this message representation, the term "service_req" represents a message label and the terms within the parentheses identify the informational elements that contain data or other information. In particular, a request is made from a user for a service request. The "user" informational element identifies the user of the service. The "provider" identifies a provider and is optional information. The "session_id" describes the service being requested by the user. The $MA_s$ 104 manages the relationship between the service user and the service provider. It takes responsibility for invoking the fulfillment agent ($FA_s$) 108 and the charging agent ($CA_s$) 112 in the service layer 100. With regard to invoking the charging agent in the service layer 100, the $MA_s$ 104 takes responsibility for sending a message along path 1.1 to the charging agent 112, with the message being defined as: 1.1) charging_transaction_req (session_id, user, service_request). This message label indicates that a financial transaction is being requested for the service over the network 10. This charging agent $CA_s$ 112 is responsible for determining the parameters associated with the particular service instance. The particular service to be provided is described in the session_id and the identity of the user for the service is also provided in the message. The $CA_s$ 112 takes responsibility for specifying how often an accounting must be made for the fulfillment taking place in the service layer 100. This is done in accordance with message path 1.2, namely: 1.2) charging_transaction_ack (session_id, service_request). In this message, the service_request includes service_request_accounting_rules, which specifies how often an accounting for this fulfillment must be made, e.g., upon completion, periodically (time or service unit based) and resource units required for rating by this $CA_s$ 112. The informational element service_request also includes a service_request_service_ca that specifies the particular charging agent to be used for the service instance requested by the user. The $MA_s$ 104 also selects the particular fulfillment agent 108, typically based on a service profile generated as a function of at least the identity of the user, the particular service request and, optionally, the identity of a provider. With respect to path 2, the message can be characterized as: 2) service-req (session_id, service_user, service_request). This message label indicates that a service request is sent to the fulfillment agent 108 denoted by service_fa informational element of the service_request, by the management agent 104 for the identified service_user, with the particular service session_id being described. Similarly, the particular charging agent 112 associated with the service_request is denoted using the service_ca informational element. In the case of FIG. 3A, the $FA_s$ 108 represents and is responsible for handling the service instance that is to be used and which is associated with the general category of the service, such as video on demand.

Figure 3B:
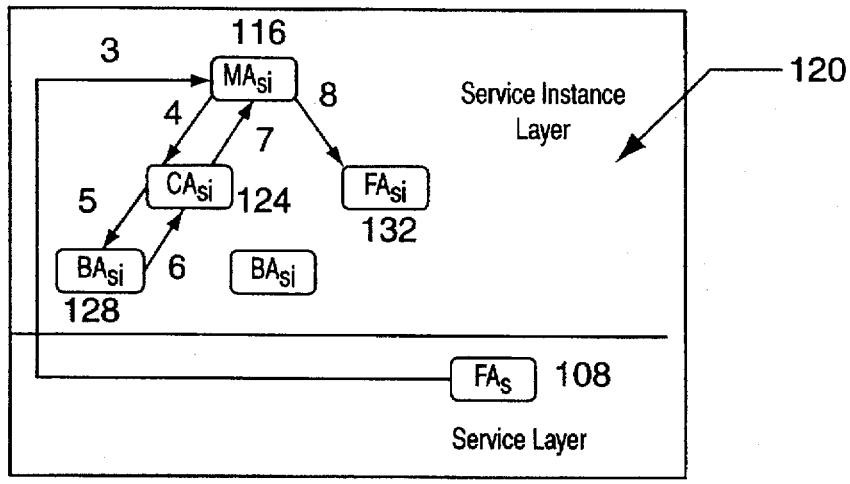

Referring to FIG. 3B, path 3 indicates the next step that is conducted for which the fulfillment agent 108 takes responsibility, namely: 3) service_instance_req (session_id, service_user, service_instance_request). This message indicates that the $FA_s$ 108 has sent a message to the appropriate or selected management agent ($MA_{si}$) 116 of the service instance layer 120. The service instance $MA_{si}$ 116 takes responsibility for managing the financial transaction and fulfillment of the particular service instance. In that regard, a message path 4 is provided, namely: 4) charging_transaction_req (session_id, service_user, service_instance_request). In accordance with this message, a financial transaction is initiated. The particular charging agent 124 is identified by a service_instance_ca informational element, which is part of the service_instance_request. In addition, part of the service_instance_request includes a service_instance_user_booking informational element that identifies a booking agent to be used and also provides booking information, e.g., is a credit check required before this particular service instance delivery. As before, service_user will identify the particular service user and the session_id will describe this particular current session related to providing of this service instance. With regard to such a credit check, path 5 provides a message generated using the charging agent 124 to an appropriate or selected booking agent ($BA_{si}$) 128 associated with the service instance layer 120. The message along this path is defined as: 5) check_credit (session_id, service_user, service_instance_amount). In accordance with this message, the $BA_{si}$ 128 checks the user's credit using the information found in the service_user informational element based on the data in the informational element service_instance_amount. The associated or underlying agent system(s) 66 actually perform(s) the function(s) for checking credit. If satisfactory, the available credit is decremented in accordance with the data or amount set forth in the designated informational element. In accordance with path 6, the $BA_{si}$ 128 sends a message to $CA_{si}$ 124 acknowledging the credit check and which message is defined as: 6) check_credit_ack (session_id). Next, the $CA_{si}$ 124 takes responsibility for charging for the fulfillment of the particular service instance, namely: 7) charging_transaction_ack (session_id, service_instance_request). In accordance with this message, the service_instance_request informational element includes information and/or data associated with service_instance_accounting_rules, which specify, for example, the rules or algorithm to financially account for the fulfillment accomplished in connection with the particular service instance. For example, the agent 124 takes responsibility for associating with one or more appropriate or selected agent systems 66 that periodically (time or service unit based) account for the service instance and take into account the resource units that might be required for any necessary charging function. In that regard, the resource units may be expressed in a general way so that the accounting rules need not be limited to a particular fulfillment agent.

Figure 3C:
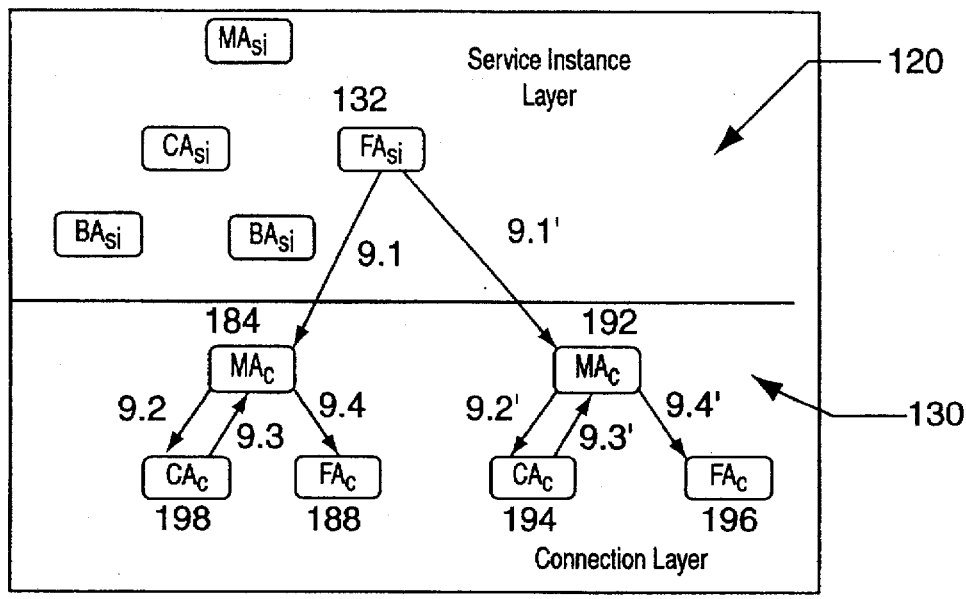

Continuing with reference to FIG. 3B, in fulfilling the particular service instance, message path 8 is next described:

8) service_instance_req (session_id, service_user, service_instance_request). Along this path, a service instance request using $MA_{si}$ 116 is made of fulfillment agent 132 ($FA_{si}$) of the service instance layer 120. Similar to the fulfillment agent 108 of the service layer 100, the $FA_{si}$ 132 takes responsibility for fulfilling a particular service instance. More specifically, as seen in FIG. 3C, the $FA_{si}$ takes responsibility for initiating a network connection request to a connection layer 130. Generally, the connection layer 130 models the "static" information in the network 10 as it relates to relationships between users and providers of services and relationships between users and communication or other service-related networks, which are part of the network 10. Such relationship information includes the identity of known customers, the identity of such communication or other service-related networks that the users have access to, what services might be available using such communications or other service-related networks and any charges that exist for having access to each of such communications or other service-related networks. For example, the connection layer 130 defines a relationship between a telephone carrier and a telephone user indicating that the particular user has access to a particular telephone communications network. A periodic charge for maintaining this relationship or "static connection" may be required, such as an amount due monthly, regardless of telephone usage.

Continuing with the description in the connection layer 130 for this general example, the $FA_{si}$ 132 takes responsibility for sending necessary messages to initiate one or more network connections that are required to deliver the particular requested service, i.e., takes care of establishing physical connections to and/or among one or more of the necessary communication or other service-related networks required to deliver the particular service. In the general example, two different network connections are represented. With reference to FIG. 3C, the $FA_{si}$ 132 takes responsibility for a message along path 9.1 to management agent ($MA_c$) 184 in the connection layer 130. This message is defined as: 9.1) connection_req (session_id, connection_user, connection_request). In accordance with this message, the $FA_{si}$ 132 initiates a first network connection request to an appropriate and selected management agent for the connection layer 130. In so doing, a connection request message is provided that describes the current session and identifies the connection user that requires the connection of this particular communications or other service-related network. The $MA_c$ 184 is responsible for ensuring that charging and fulfillment agents are specified in order to provide the particular service instance and use the necessary connections associated with the connection layer 130. Similarly, for a second connection that is required for the particular service instance in the connection layer 130, message path 9.1' is utilized, namely: connection_req (session_id, connection_user, connection_req). This message indicates that the $FA_{si}$ 132 has initiated a second connection request for delivering this particular service. This request is sent to another management agent $MA_c$ 192 of the connection layer 130.

With respect to the first connection request, the $MA_c$ 184 takes responsibility for selecting an appropriate charging agent in the connection layer 130, which is done along message path 9.2, namely: 9.2) charging_transaction_req (session_id, connection_user, connection_request). This message is sent to the charging agent ($CA_c$) 198 of the connection layer 130. The $CA_c$ 198 represents the financial relationship between the service instance provider (in this case, the user of this network connection in the connection layer 130) and the network provider (in this case, the provider of this network connection in the connection layer 130). The message to the $CA_c$ 198 results in a financial transaction for this first network connection to be established over the particular communications or other service-related network that is being requested. The $CA_c$ 198 is involved with determining parameters associated with the specific or "dynamic" connections that are to be established (connection_instances) in order to provide the particular service instance.

In connection with charging for the fulfillment associated with this first network connection, a message is initiated by the $CA_c$ to the $MA_c$ 184 along message path 9.3, namely: 9.3) charging_transaction_ack (session_id, connection_request). In particular, the connection_request includes a connection_request_accounting_rules that specifies how often an accounting for the fulfillment must be made related to this first network connection, such as upon completion, periodically (time or service unit based), together with the resource units required for rating by the $CA_c$ 198. The connection_request also includes the informational element connection_request_connection_ca, which specifies the identity of the $CA_c$ 198 that is to be used when charging for this first network connection. With respect to fulfilling the necessary network connection tasks associated with the particular service instance, the $MA_c$ 184 takes responsibility for a message along path 9.4 to the fulfillment agent ($FA_c$) 188 of the connection layer 130. The message 9.4 is defined as: 9.4) connection_req (session_id, connection_user, connection_request). In accordance with this message, the $FA_c$ 188 is informed that a use of the particular communications or other service-related network is required and a connection therewith is requested.

Similar to the requirements and contents of messages for the first network connection, the following messages are utilized in the connection layer 130 to provide a second network connection necessary for delivery of the service instance:

9.2') charging_transaction_req (session_id, connection_user, connection_request);

9.3') charging_transaction_ack (session_id, connection_request); and 9.4') connection_req (session_id, connection_user, connection_request).

The message initiated by the $MA_c$ 192 along path 9.2' is directed to the connection to be established over the particular communications or other service-related network that is requested. The agent receiving this message is another charging agent ($CA_c$) 194 for the connection layer 130. The $CA_c$ 194 is responsible for determining the parameters associated with the dynamic connections to be set up for using this particular communications or other service-related network. The $CA_c$ 194 is also responsible for a message along path 9.3' to $MA_c$ 192 relating to the accounting for the fulfillment of the functions required in the connection layer 130, as applied to this second network connection. With respect to fulfillment of this second network connection, the message along path 9.4' is received by the fulfillment agent ($FA_c$) 196 of the connection layer 130, which message relates to the use of the communications or other service-related network required for this second connection in order to provide this particular service instance requested by a user.

Figure 3D:
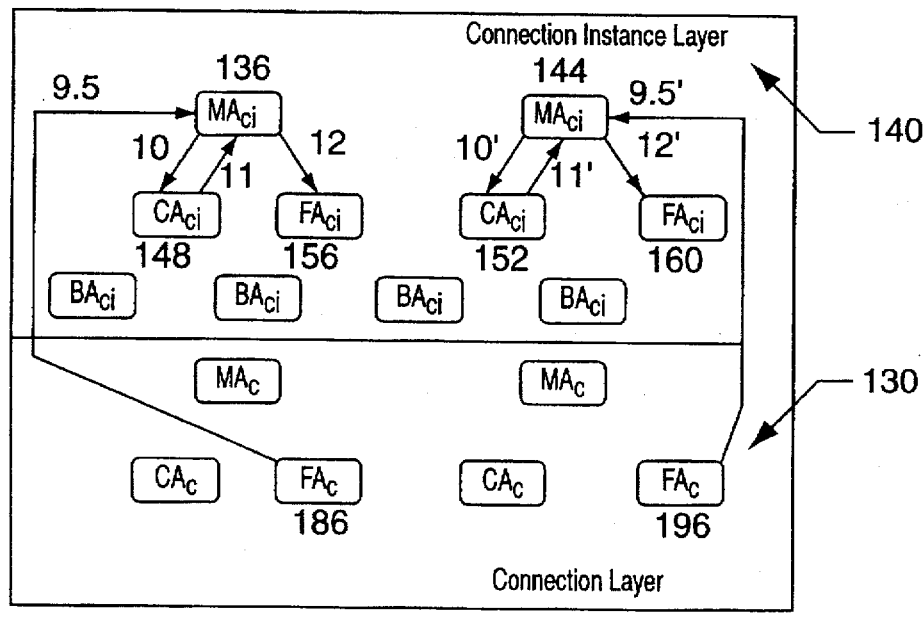

With regard to fulfilling the particular network connections requested of the $FA_c$ 186 and $FA_c$ 196, reference is made to FIG. 3D. Specifically, $FA_c$ 186 initiates a message from the connection layer 130 to the connection instance layer 140 along path 9.5 to the management agent ($MA_{ci}$) 136. This message is defined as: 9.5) connection_instance_req (session_id, connection_user, connection_instance_request). In accordance with this message, the $FA_c$ 186 initiates a first network connection_instance request to an appropriate and selected management agent for connection instance layer 140. In so doing, a connection_instance request message is provided that describes the current session and identifies the connection_user that is in need of the particular network connection. Similarly, where a second network connection is required for the particular service instance, a message path 9.5' is defined, namely: 9.5') connection_instance_req (session_id, connection_user, connection_instance_request). This indicates that the $FA_c$ 196 has initiated a second network connection_instance request that is required to deliver the particular service. This request is sent to another management agent ($MA_{ci}$) 144 of the connection instance layer 140. These two messages initiate the dynamic connections that must occur in the connection instance layer 140 in order to deliver the particular service. For example, in the particular communications or other service-related network that has been designated to assist in providing the service, certain connections must be made.

With respect to the first network connection_instance, the $MA_{ci}$ 136 manages the fulfilling and charging for this particular network connection along a path denoted as: 10) charging_transaction_req (session_id, connection_user, connection_instance_request). In accordance with this message, the $MA_{ci}$ 136 is involved with determining the appropriate charging agent of the connection instance layer 140 associated with this particular network connection, namely, charging agent ($CA_{ci}$) 148. The $MA_{ci}$ 136 determines the appropriate $CA_{ci}$ 148 since the $CA_{ci}$ 148 may need fulfillment agent specific information to rate the resources used by the selected fulfillment agent, which takes responsibility for accomplishing this network connection_instance function. Similarly, path 10' has the message identified as: charging_transaction_req (session_id, network_user, connection instance _request). As with path 10, path 10' indicates that the $MA_{ci}$ 144 has taken responsibility for the second network connection_instance by selecting an appropriate charging agent ($CA_{ci}$) 152 that takes responsibility for charging for the second network connection_instance.

With regard to the first network connection_instance, the $CA_{ci}$ 148 sends an acknowledgement to the $MA_{ci}$ 136. This acknowledgement message is provided in accordance with path 11 and is identified as: 11) charging_transaction_ack (session_id, connection_instance_request). In this message, the connection_instance_request informational element includes connection_instance_request_accounting_rules that specify how often an accounting for the fulfillment of this particular network connection_instance must be made, e.g., upon completion, periodically (time or service unit based) and resource units required for rating by the $CA_{ci}$ 148. Likewise, for the second network connection_instance along path 11', a message is identified as: 11') charging_transaction_ack (session_id, connection_instance_request). The same type of acknowledgement is provided to the $MA_{ci}$ 144 by the $CA_{ci}$ 152 as it relates to the second network connection_instance.

In fulfilling these two network connection_instances, the following paths and associated messages are defined: 12) connection_instance_req (session_id, connection_user, connection_instance_request) and 12') connection_instance_req (session_id, connection_user, connection_instance_request). In the case of path 12, the $MA_{ci}$ 136 takes responsibility for initiating a connection_instance request that is to be fulfilled by sending a message to an appropriate and selected fulfillment agent ($FA_{ci}$) 156 of the connection instance layer 140. The $FA_{ci}$ 156 takes responsibility for fulfilling the connection_instance function or functions associated with this particular network connection_instance and initiates one or more agent systems 66 for accomplishing the necessary function or functions Likewise, along path 12', a fulfillment agent ($FA_{ci}$) 160 of the connection instance layer 140 takes responsibility for fulfilling the second of the network connection_instances.

Figure 3E:
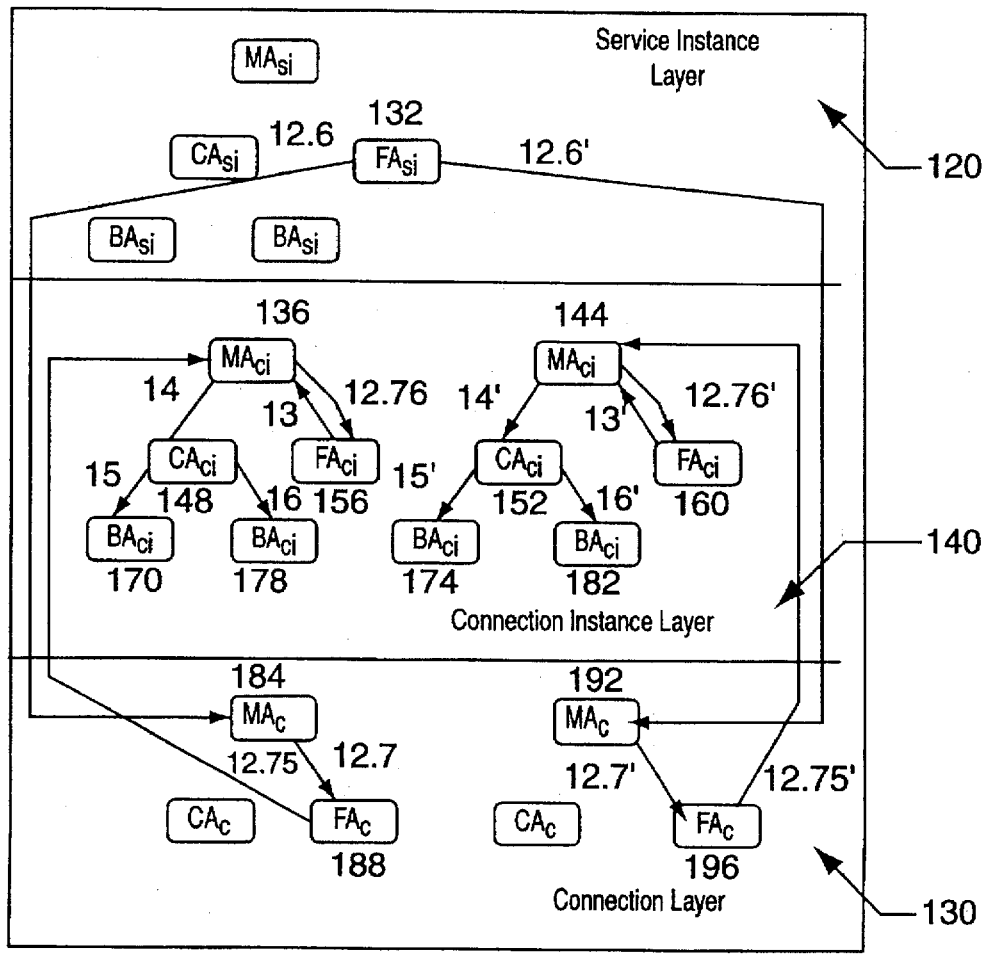

Referring to FIG. 3E, a description is set forth related to completion of the service instance. With respect to the first network connection_instance, along path 12.6, a message is defined as: 12.6) release_connection (session_id). In accordance with this message, the $FA_{si}$ 132 has assumed responsibility related to the determination that the service instance has been completed. The $FA_{si}$ 132 also subsequently takes responsibility for accomplishing the function(s) necessary to release this particular network connection by sending a message to the $MA_c$ 184. Similarly, for the second network connection, along path 12.6', a message is defined as: 12.6') release_connection (session_id). That is, a message describing the current session_id is generated for which $FA_{si}$ 132 has taken responsibility and which message is received by the second management agent ($MA_c$) 192. Next, each of the $MA_c$ 184 and $MA_c$ 192 has a message path to the $FA_c$ 188 and the $FA_c$ 196, respectively. These are denoted as: 12.7) release_connection (session_id) and 12.7') release_connection (session_id). In accordance with these messages, each $MA_c$ 184 and $MA_c$ 192 takes responsibility for passing these two network connection releases onto their associated fulfillment agents, namely, $FA_c$ 188 and $FA_c$ 196, respectively. Upon receipt of the message related to the release of the first connection, the $FA_c$ 188 takes responsibility for releasing this first network connection. As part of this release, the $FA_c$ 188 initiates a message from the connection layer 130 to the connection instance layer 140 for use in releasing the particular connection_instance or dynamic connection that was required to provide the service instance. This message is conveyed along path 12.75 to the $MA_{ci}$ 136 and is defined as: 12.75) release_connection_instance (session_id). This message includes the informational element that describes the current session being handled for which a release of the particular or dynamic connection is to occur. Similarly, for the second network connection_instance to be released, a message is initiated by the $FA_c$ 196 in the connection layer 130 to the $MA_{ci}$ 144 in the connection instance layer 140 along message path 12.75'. This message is defined as: 12.75') release_connection_instance (session_id). Next, each of the $MA_{ci}$ 136 and $MA_{ci}$ 144 has a message path to the $FA_{ci}$ 156 and $FA_{ci}$ 160, respectively. These are denoted as 12.76) release_connection_instance (session_id) and 12.76') release_connection_instance (session_id). In accordance with these messages, each $MA_{ci}$ 136 and $MA_{ci}$ 144 takes responsibility for passing these two network connection instance releases on to their associated fulfillment agents, namely, $FA_{ci}$ 156 and $FA_{ci}$ 160, respectively. Upon receipt of the message related to the first connection_instance, the $FA_{ci}$ 156 takes responsibility for releasing this first network connection_instance and reports resource usage using a message defined as: 13) connection_instance_release (session_id, connection_instance_resources). A similar message is conveyed using $FA_{ci}$ 160 to $MA_{ci}$ 144 related to the second network connection_instance, namely: 13') connection_instance_release (session_id, connection_instance_resources). This message also reports resource usage for the second network connection_instance to the $MA_{ci}$ 144, while taking responsibility for release of the second network connection_instance. With respect to billing for these two network connection_instances, the following paths and associated messages are identified: 14) charge_transaction (session_id, connection_instance_resources) and 14') charge_transaction (session_id, connection_instance_resources). Message 14 is sent by the $MA_{ci}$ 136 to the charging agent $CA_{ci}$ 148, which agent takes responsibility for charging a determined amount for this particular network connection_instance based on connection instance resources that are utilized. In accordance with message path 14', similar functions are performed for the second network connection_instance that requires a message be sent to $CA_{ci}$ 152 using $MA_{ci}$ 144.

In taking responsibility for handling of the booking associated with the first network connection_instance, the $CA_{ci}$ 148 is involved in sending a message to a booking agent ($BA_{ci}$) 170 of the connection instance layer 140, which is defined as: 15) debit (session_id, connection_instance_request_connection_user_booking, amount). This message indicates that for the current session as described, an amount is to be booked or debited to a particular account, which is, typically, the connection_instance user's account and in which the $BA_{ci}$ 170 takes responsibility for accomplishing the functions associated therewith. Likewise, for the second network connection_instance, a similar message is provided along path 15', namely: 15') debit (session_id, connection_instance_request_connection_user_booking, amount). This message is received by the booking agent ($BA_{ci}$) 174 of the connection instance layer 140.

With regard to crediting an account associated with each of these two network connections, paths 16 and 16' are denoted with accompanying messages that can be identified as: 16) credit (session_id, connection_instance_request_provider_booking, amount) and 16') credit (session_id, connection_instance_request_connection_provider_booking, amount). A booking agent ($BA_{ci}$) 178 and a booking agent ($BA_{ci}$) 182, respectively, receive these messages. Each of these two booking agents 178, 182 is identified in the respective messages and take responsibility for crediting a specified amount based on the particular network connection_instance, which is identified using the current session informational element. Typically, the provider of the network connection_instance service has its account credited.

With regard to handling how charges are reported to an end user, in accordance with the foregoing example, there are two network connection related charges, two network connection_instance related charges and one service related charge and one service instance related charge. The present invention is adaptable or flexible in being able to provide multiple separate entries to the end user in conjunction with charging the end user or, alternatively, one consolidated entry or a further function could be applied to the multiple charges to generate a new composite charge.

Figure 3F:
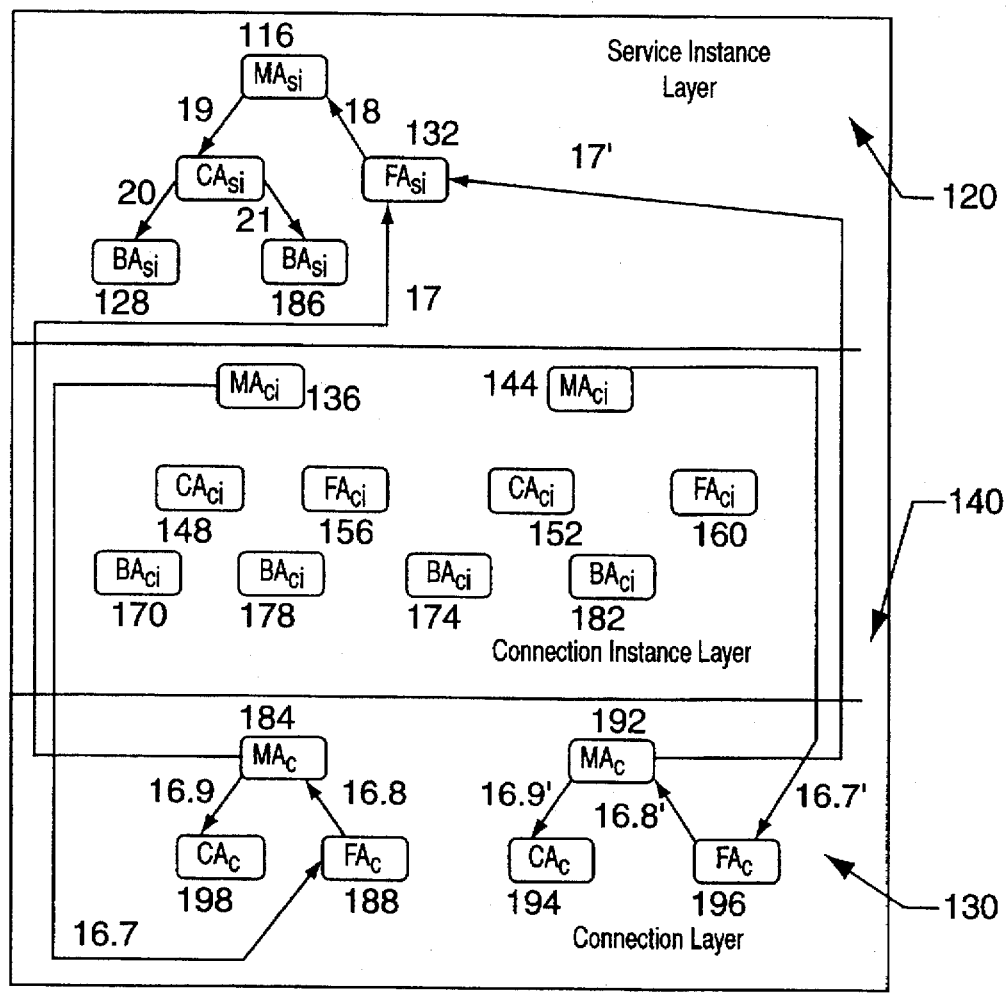

In continuing with this general example and referring to FIG. 3F, messages involving each of $MA_{ci}$ 136 and $MA_{ci}$ 144 are sent to the $MA_c$ 184 and the $MA_c$ 192 of the connection layer 130 in order to cause a release of these previously provided connections. These messages are along paths 16.7 and 16.7' and are defined as: 16.7) connection_instance_released (session_id) and 16.7') connection_instance_released (session_id). Each of these two messages informs the $FA_c$ 188 and the $FA_c$ 196 of the connection layer 130 that the particular connections for delivering the previously provided service have been released. The $FA_c$ 188 and $FA_c$ 196 take responsibility for handling the information related to each of the two network connection_instances for the current session that is identified in the respective messages. In addition, the $FA_c$ 188 takes responsibility for a message that is sent to the $MA_c$ 184 with the message content indicating to the $MA_c$ 184 that the first network connection in the connection layer 130 has been released. This message is defined as: 16.8) connection_released (session_id). Likewise, for the second network connection in the connection layer 130, the message along path 16.8' is initiated by the $FA_c$ 196 to the $MA_c$ 192, which message is identified as: 16.8') connection_released (session_id). Subsequent to the receipt of the message along path 16.8, the $MA_c$ 184 is involved with the initiation of a message along path 16.9 to the $CA_c$ 198. This message is defined as: 16.9) charge_transaction (session_id, connection_resources). The informational elements of this message inform the $CA_c$ 198 of the current session that was completed and the identity of connection layer resources that were utilized for which an accounting might be made. Likewise, along path 16.9', a message is initiated by the $MA_c$ 192 to the $CA_c$ 194 related to possible accounting for use of the connection resources, which message is defined as: 16.9') charge_transaction (session_id, connection_resources).

With continued reference to FIG. 3F, the $MA_c$ 184 also takes responsibility for initiating a message from the connection layer 130 to the service instance layer 120 in light of the completion of the particular service instance. More specifically, the $MA_c$ 184 sends a message along path 17 to the fulfillment agent 132 ($FA_{si}$). This message is defined as: 17) connection_released (session_id). Similarly, the $MA_c$ 192 initiates a message along path 17' to the $FA_{si}$ 132, which is defined as: 17') connection_released (session_id). The $FA_{si}$ 132 takes responsibility for handling the information related to the release of each of the two network connections for the current session that is identified in the respective messages. Additionally, the $FA_{si}$ 132 takes responsibility for reporting service instance resource usage for the current session to the $MA_{si}$ 116 in accordance with the message: 18) service_released (session_id, service_instance_resources). Next, a message along path 19 is provided: 19) charge_transaction (session_id, service_instance_resources). This message is sent to the $CA_{si}$ 124, which takes responsibility for charging appropriate accounts based on resource unit usage in the service instance layer 120 and based on predetermined rules or algorithms. The $CA_{si}$ 124 is also responsible for using agent systems to accomplish these functions including the determination of the amounts to be booked. In that regard, along path 20, a message is sent defined as: 20) debit (session_id, service_instance_request_user_booking, amount), the $BA_{si}$ 128 takes responsibility for debiting the amount to the appropriate account based on the content of the informational elements in the message. Similarly, along path 21, the proper account is credited for the particular service instance in accordance with the following: 21) credit (session_id, service_instance_request_user_booking, amount). The data and/or information associated with this message is used by the $BA_{si}$ 186 in crediting the appropriate provider account for the service instance that was just delivered.

Figure 3G:
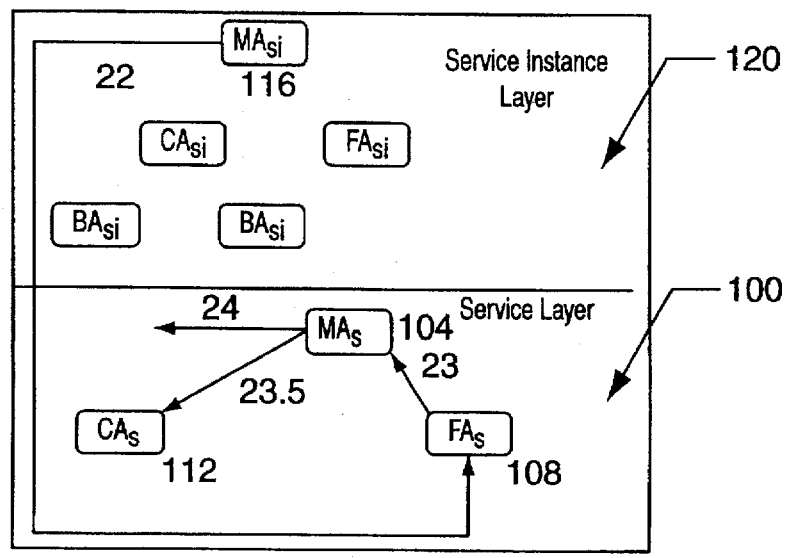

With reference to FIG. 3G, the $MA_{si}$ 116 is involved with initiating a message along path 22 to the $FA_s$ 108 in the service layer 100, namely: 22) service_released (session_id). This message is received by the $FA_s$ 108 and it takes responsibility for any functions required in connection with the service being released for the current session that is identified by the message. Similarly, the $FA_s$ 108 takes responsibility for sending a message along path 23 that is received by the $MA_s$ 104, which is identified as: 23) service_released (session_id, service_resources). The $MA_s$ 104 takes responsibility for initiating a message along path 23.5 to the $CA_s$ 112, which is defined as: 23.5) charge_transaction (session_id, service resources). The informational elements of this message inform the $CA_s$ 112 of the current service session being completed and the resources used in the service layer 100 that can be financially accounted for in connection with the service that was completed. The $MA_s$ 104 also initiates a message along path 24, namely: 24) service_released (session_id) in which the $MA_s$ 104 is involved in sending a message along this path to a user or other indicating that the service has been released.

In continuing with the explanation of the present invention, the foregoing general example is applied to a specific service instance application. Specifically, a video on demand service is presented as an example in which the user requests a movie. In this example, the provider of the service instance and the provider of the network connection_instances are separate business entities. The user has chosen to pay for each and any service, service instance, connection and connection_instance charges by credit card.

Figure 4A:
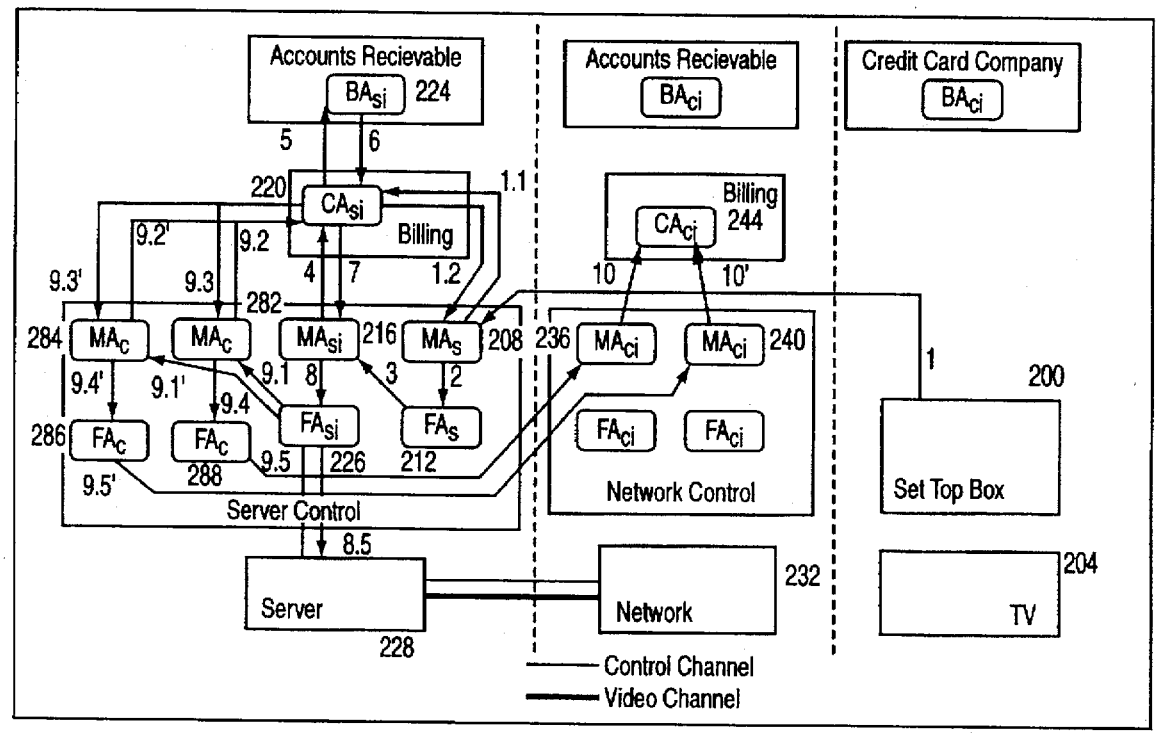
FIGS. 4A–4D schematically illustrate a specific example of the operations gateway as applied to a video on demand service.

As seen in FIG. 4A in this example of an application of the present invention, a set top box 200 is provided that operatively communicates with a television 204. The set top box 200 is a network system that is able to initiate the sending of messages to agents 54 of the agent interface 58. In accordance with the current example, the particular message relates to a video on demand service. As illustrated in FIG. 4A, a message path is denoted as originating from the set top box 200 of a user of the network 10. This path is identified as follows: 1) service_req (session_id, user, provider, service_request). In accordance with this message, a request is made from a user (set top box 200) for a service_request (video on demand). The identification of a particular provider is optional since a subsequent determination can be made as to the identity of the provider and, therefore, a particular provider need not be identified in the message. The message is conveyed to a management agent ($MA_s$) 208 in the service layer. The $MA_s$ 208 takes responsibility for a message being generated, based on the service request that it receives, to a charging agent 220. In this embodiment, the charging agent 220 takes responsibility for handling financial transactions from a number of different layers, including the service, service instance and connection layers. Although the charging agent 220 could be considered as being associated with each one or all of the layers, for this example, it will be designated as being in the service instance layer and is identified as $CA_{si}$ 220. The message from the $MA_s$ 208 to the $CA_{si}$ 220 is along path 1.1, which is defined as: charging_transaction_req (session_id, user, service_request). This message indicates that a financial transaction for the connection to be established over the network is being requested. The $CA_{si}$ 220, in accordance with this message, is responsible for determining the parameters associated with the service instance. The $CA_{si}$ 220 initiates a message along path 1.2 back to the $MA_s$ 208, which is defined as follows: 1.2) charging_transaction_ack (session_id, service_request). This message indicates how often an accounting for the fulfillment of this video on demand service must be made, e.g., upon completion of the video on demand, periodically (time or service unit based) and resource units that are required for rating by the $CA_{si}$ 220. In that regard, the service_request includes the informational element service_request_accounting_rules. In addition, the service_request informational element includes a service_request_service_ca that specifies the particular charging agent to be used for the service instance, namely $CA_{si}$ 220.

The $MA_s$ 208 also manages the relationship between the service user associated with the set top box 200, and a service provider, who supplies the video on demand service. The $MA_s$ 208 takes responsibility for accomplishing certain functions related to the video on demand service and, in that regard, selects the appropriate fulfillment agent(s) and charging agent(s) to be used for delivery of the particular service instance (particular movie from the video on demand service). The $MA_s$ 208 typically selects a particular charging agent and fulfillment agent based on a service profile generated as a function of the identity of the user requesting the service, the identity of the service request and, optionally, the identity of the provider of the service.

In accomplishing these functions, the $MA_s$ 208 is involved with sending a message along path 2 to a fulfillment agent ($FA_s$) 212 in the service layer, which is defined as: 2) service_req (session_id, service_user, service_request). In accordance with this message, the service user of the service layer is identified as making a service request with the current session_id describing the particular service being requested as it relates to fulfilling a video on demand service. The $FA_s$ 212 takes responsibility for fulfilling the particular service instance and in selecting the appropriate management agent for delivery of the desired service instance (providing the movie selected by the user). In doing this, the $FA_s$ 212 takes responsibility for a message being sent along path 3 to a management agent ($MA_{si}$) 216 in the service instance layer. This message is denoted as: 3) service_instance_req (session_id, service_user, service_instance_request). In accordance with this message, the $MA_{si}$ 216 manages the financial transaction and fulfillment of the service instance associated with providing the particular movie using the video on demand service. With regard to managing the financial transaction, the $MA_{si}$ 216 takes responsibility for sending a message along path 4 to a charging agent ($CA_{si}$) 220 in the service instance layer, in accordance with the following: 4) charging_transaction_req (session_id, service_user, service_instance_request). The particular charging agent 220 is specified by the content of the informational element service_instance_ca, which is part of the service_instance_request. Also part of the service_instance_request informational element is a service_instance_user_booking, which identifies both the booking agent to be used and also provides booking information, e.g., is a credit check required before delivery of this service instance. Next, the $CA_{si}$ 220 takes responsibility for a message that is received by a booking agent ($BA_{si}$) 224 of the service instance layer along path 5 and which message is defined as: 5) check_credit (session_id, service_user, service_instance_amount). The $BA_{si}$ 224 checks this service user's credit for the amount identified in the message. If the credit is satisfactory, the $BA_{si}$ 224 decrements available credit by this amount. In acknowledging the credit check, the $BA_{si}$ 224 takes responsibility for sending a message back to the $CA_{si}$ 220 acknowledging the credit check of the service user in accordance with the message path defined as: 6) check_credit_ack (session_id). This message indicates to the $CA_{si}$ 220 that, for the current session_id directed to the particular movie being requested, the user's credit has been checked and found satisfactory for fulfilling or delivering this particular movie. The $CA_{si}$ 220 then takes responsibility for sending a message to the $MA_{si}$ 216, which message relates to accounting for the fulfillment of the service instance (delivery of a movie using a video on demand service). More specifically, along path 7, the following message is defined: 7) charging_transaction_ack (session_id, service_instance_request). With this message, the $MA_{si}$ 216 receives information directed to describing the current session and the service instance request includes service_instance_request_accounting_rules, which specify how often an accounting for this particular fulfillment must be made, such as upon completion of the movie being sent to the user or periodically, based on time or service units and the resource units for charging or rating that are required by the $CA_{si}$ 220.

After receipt of this message from the $CA_{si}$ 220, the $MA_{si}$ 216 takes responsibility for a message being sent and received by a fulfillment agent $FA_{si}$ 226 of the service instance layer. This message path is defined as: 8) service_instance_req (session_id, service_user, service_instance_request). This message informs the $FA_{si}$ 226 of the request for the particular movie to be delivered to the user. In particular, the $FA_{si}$ 226 takes responsibility for delivering an internal, proprietary message along path 8.5 in order to connect the particular movie that is found in a server 228 to a video channel and thereby to a network 232.

Relatedly, the $FA_{si}$ 226 takes responsibility for sending one or more messages to appropriate agents that take responsibility for the network connections required to deliver the particular movie. In the present example, two network connections are required to deliver the particular video on demand service. For the first network connection, the $FA_{si}$ 226 initiates a message along path 9.1 from the service instance layer to the connection layer. Specifically, the management agent ($MA_c$) 282 receives the message, which is identified as: 9.1) connection_req (session_id, connection_user, connection_request). By this message, the $FA_{si}$ 226 initiates a first network connection request for providing the particular video on demand service. The $MA_{si}$ 282 is responsible for ensuring that charging and fulfillment agents are specified. Similarly, along message path 9.1', a second network connection request is provided from the $FA_{si}$ 226 to the management agent ($MA_c$) 284 in the connection layer. This message is defined as: 9.1') connection_req (session_id, connection_user, connection_request).

With respect to handling the financial relationship between the user of the first network connection and the provider of the network connection, the $MA_c$ 282 initiates a message along path 9.2 to the $CA_{si}$ 220. This message is defined as: 9.2) charging_transaction_req (session_id, connection_user, connection_request). In accordance with this message, a financial transaction for the first connection to be established over the network 10 using a communications or other service-related network is requested. The $CA_{si}$ is responsible for determining the parameters associated with the dynamic connections that are to be set up. Similarly, the $MA_c$ 284 initiates a message along path 9.2' to the $CA_{si}$ 220, in connection with the second network connection, for the same reasons that the message along path 9.2 was sent to the same charging agent.

The $CA_{si}$ 220 then takes responsibility for generation of messages acknowledging the charging transactions for the first and second network connections, along message paths 9.3 and 9.3'. Specifically, the $CA_{si}$ 220 sends a message to the $MA_c$ 282 defined as: 9.3) charging_transaction_ack (session_id, connection_request). The connection_request informational element includes the informational elements connection_request_accounting_rules, which specifies how often an accounting for this fulfillment must be made, and a connection_request_connection_ca, which specifies the charging agent used for this first network connection. Similarly, the message along path 9.3' is defined as: 9.3') charging_transaction_ack (session_id, connection_ request), which is sent to the MA$_c$ 284 and provides the same message information as that provided along path 9.3.

Next, the MA$_c$ 282 initiates a message along path 9.4 to the fulfillment agent (FA$_c$) 288 in the connection layer. The FA$_c$ 288 represents a specific network capable of fulfilling the connection request between the service instance provider and the user. Likewise, for the second network connection, the MA$_c$ 284 is responsible for the initiation of a message to the fulfillment agent (FA$_c$) 286 of the connection layer, which is capable of fulfilling the second connection request between the service instance provider and the user.

Subsequently, the FA$_c$ 288 takes responsibility for fulfilling the necessary dynamic connection or connections in the connection instance layer for providing these particular service instances to the user. In the present example, a message along path 9.5 is received by a management agent (MA$_{ci}$) 236 in the connection instance layer and is identified as: 9.5) connection_instance_req (session_id, connection_user, connection_instance_request). In accordance with this message, the current session is described related to providing the particular movie associated with the video on demand service, such as the provider of the service instance or the user of the service instance together with the identity of the connection_instance user. The message also identifies the request to be a network connection_instance that is required to deliver this particular movie. In accordance with this message, the MA$_{ci}$ 236 takes responsibility for initiating the appropriate functions to achieve the network connections using the agent system or systems that communicate with this management agent. Similarly, along path 9.5', defined as follows: 9.5') connection_instance_req (session_id, connection user, connection_instance_request), a message is received by a further management agent (MA$_{ci}$) 240 of the connection instance layer. Like MA$_{ci}$ 236, the MA$_{ci}$ 240 initiates another network connection request that is required to deliver the particular movie.

Each of the MA$_{ci}$ 236 and the MA$_{ci}$ 240 takes responsibility for initiating a financial transaction associated with the network, as defined by these respective paths: 10) charging_transaction_req (session_id, connection_user, connection_instance_request) and 10') charging_transaction_req (session_id, connection_user, connection_instance_request). In each case, the MA$_{ci}$ 236 and MA$_{ci}$ 240 initiates a financial transaction by initiating the sending of a message to a charging agent (CA$_{ci}$) 244 associated with the connection instance layer. In each case, the MA$_{ci}$ 236 and the MA$_{ci}$ 240 takes responsibility for determining that the CA$_{ci}$ 244 should take responsibility for charging for the network connection_instances related to the providing of the particular movie. These connection management agents make sure that the charging agent 244 receives the necessary specific information to rate the resources used by one or more fulfillment agents that are involved in fulfilling the one or more network connections.

Figure 4B:
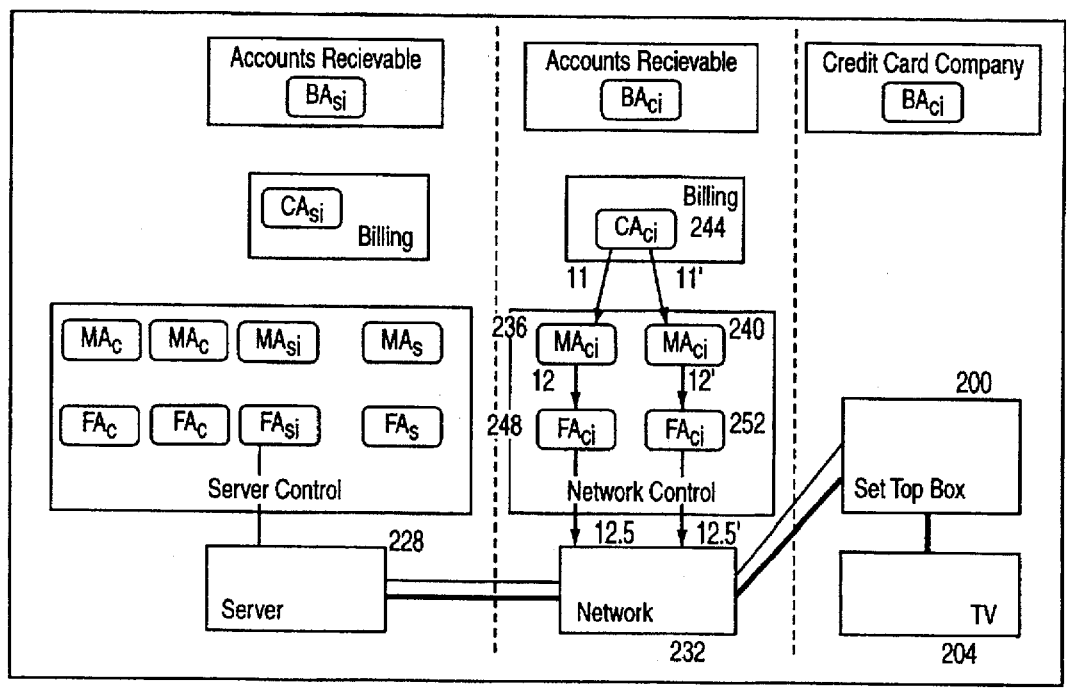

Referring to FIG. 4B, the CA$_{ci}$ 244 is involved with a message being sent to each of two management agents in the connection instance layer, which messages are identified as: 11) charging_transaction_ack (session_id, connection_instance_request) and 11') charging_transaction_ack (session_id, connection_instance_request). Each of these acknowledging messages contain information or data that specifies how often an accounting for the fulfillment of this network connection_instance must be made for the particular movie that is being transmitted, just as was done in the other layers. Such information or data related to the accounting is contained in the connection_instance_request_ accounting_rules informational element which may include information that the accounting for this connection_ instance fulfillment is to made upon completion of the particular network connection_instance or on a periodic basis, based on time and/or service units. Such information is also expected to include the resource units for rating that are required by the CA$_{ci}$ 244.

In fulfilling the necessary network connection_instances, the following messages are identified: 12) connection_req (session_id, connection_user, connection_instance_ request) and 12') connection_req (session_id, connection_ user, connection_instance_request). These messages are sent to fulfillment agents in the connection instance layer, namely, FA$_{ci}$ 248 and FA$_{ci}$ 252, respectively. Each of these messages provides information and data to these fulfillment agents 248, 252 to enable them to ascertain that a network connection is being requested. These agents take responsibility for accomplishing the particular network connection functions that must be dynamically made in order to deliver the particular movie to the user. In accordance with fulfilling these functions, an internal, proprietary message is generated to connect the incoming channel from the server 228 through the network 232 to a specific channel to the user. These message paths for the two network connections of the present example are identified as 12.5 and 12.5'. As can be appreciated, a substantial number of functions and communications must occur in order to provide the necessary connections to the set top box 200 by the network 232.

Figure 4C:
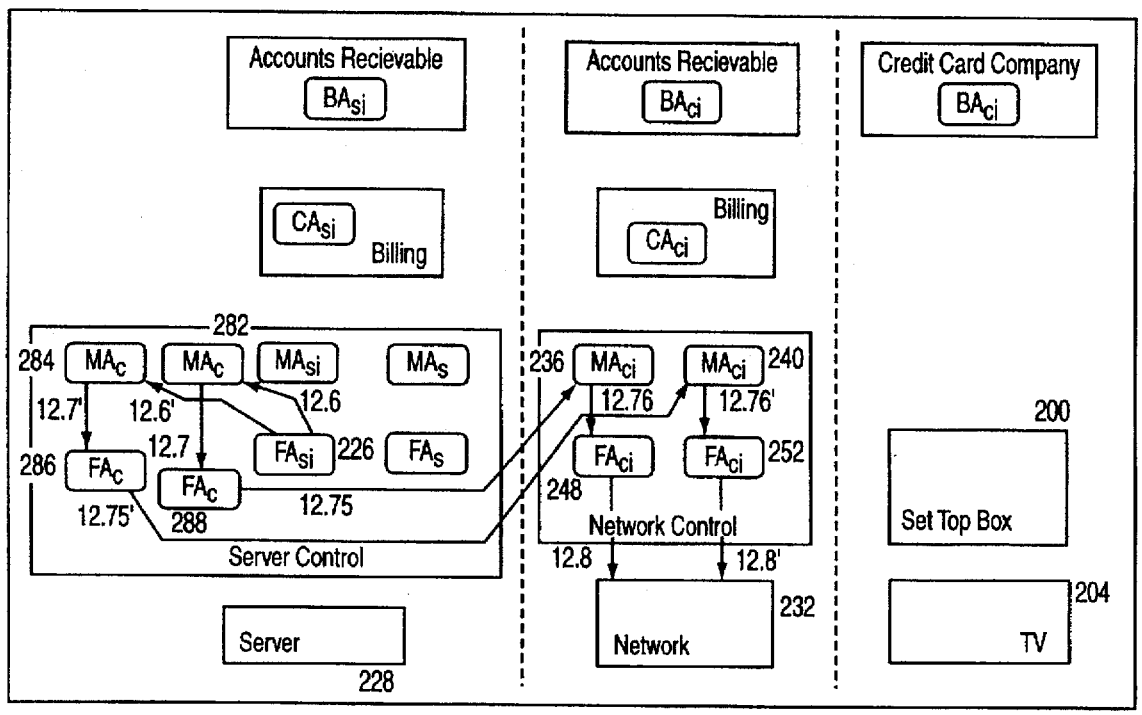
Figure 4D:
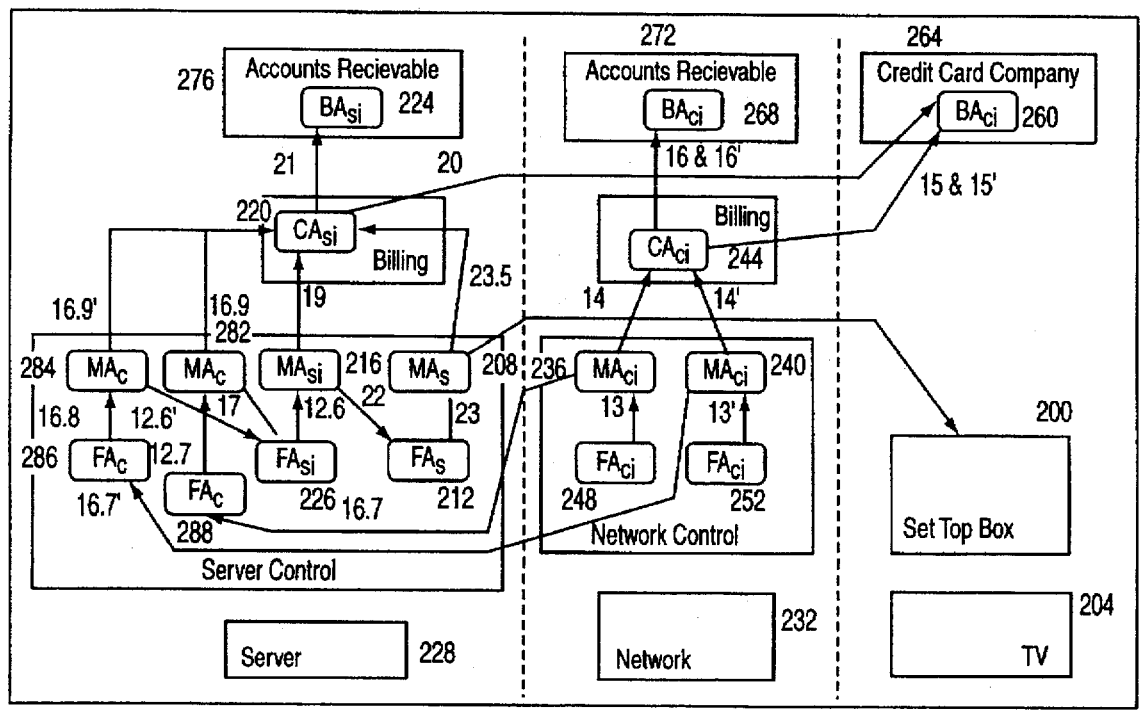

With reference to FIG. 4C, the description of the example is continued with the video on demand service having been completed. Specifically, along paths 12.6 and 12.6', messages that originate in the service instance layer involving the FA$_{si}$ 224 are received by connection layer management agents MA$_c$ 282 and MA$_c$ 284, respectively, and which are denoted as: 12.6) release_connection (session_id) and 12.6') release_connection (session_id). Each of these received messages provides information to the respective management agents 282, 284 that the current session being described is now finished and these two agents must take responsibility for managing the release of the previously formed connections. In doing so, the FA$_c$ 288 and the FA$_c$ 286 receive messages initiated by the MA$_c$ 282 and the MA$_c$ 284 along paths 12.7 and 12.7', namely: 12.7) release_ connection (session_id) and 12.7') release_connection (session_id). In accordance with these messages, each of the MA$_c$ 282 and the MA$_c$ 284 takes responsibility for managing the appropriate fulfillment agents which, in turn, assume responsibility for releasing the first and second network connections made with the necessary communications or other service-related networks because the delivery of the particular movie to the user has been completed. In that regard, the FA$_c$ 288 initiates a message along path 12.75 to the connection instance layer. That is, a message is received by the MA$_{ci}$ 236. Similarly, the FA$_c$ 288 initiates a message along path 12.75' to the MA$_{ci}$ 240 in the connection instance layer related to releasing the specific network connections that were utilized in delivery of the particular movie. These messages along paths 12.75 and 12.75' are defined as: 12.75) release_connection_instance (session_ id) and 12.75') release_connection_instance (session_id). Each of these received messages provides information to the respective management agents 236, 240 that the current session being described is now finished and these two agents must take responsibility for managing the release of the previously formed connection_instances. In order to do so, the $FA_{ci}$ 248 and the $FA_{ci}$ 252 receive messages initiated by the $MA_{ci}$ 236 and the $MA_{ci}$ 240 along paths 12.76 and 12.76', namely: 12.76) release_connection_instance (session_id) and 12.76') release_connection_instance (session_id). In accordance with these messages, each of the $MA_{ci}$ 236 and the $MA_{ci}$ 240 takes responsibility for managing the appropriate fulfillment agents which, in turn, assume responsibility for releasing the dynamically generated network connection_instances, since the delivery of the particular movie to the user has been completed. The $FA_{ci}$ 248 and the $FA_{ci}$ 252 also take responsibility for generating proprietary messages that disconnect this previously provided communication paths through the network 232 along paths 12.8 and 12.8'. Referring next to FIG. 4D, messages are initiated by the $FA_{ci}$ 248 and the $FA_{ci}$ 252 that are received by the $MA_{ci}$ 236 and the $MA_{ci}$ 240 along paths 13 and 13' which are defined as: 13) connection_instance_released (session_id, connection_instance_resources) and 13') connection_instance_released (session_id, connection_instance_resources). In accordance with these messages, information is provided that the network connection_instances are released and resource usage is reported to these management agents, who will take responsibility for managing the charging associated with the network connection_instances that delivered the selected movie. In that regard, the $CA_{ci}$ 244 receives messages along paths 14 and 14' that are identified as: 14) charge_transaction (session_id, connection_instance_resources) and 14') charge_transaction (session_id, connection_instance_resources). In accordance with these messages, the charging agent 244 takes responsibility for determining and charging the amount for these network connection_instances associated with the particular service instance. As part of this responsibility, the $CA_{ci}$ 244 is responsible for sending messages that are received by one or more booking agents. In particular, a booking agent ($BA_{ci}$) 260 is responsible for functions related to the debiting of the user's account. In the present example, this involves a credit card whereby the appropriate account in the credit card company 264 is debited for these network connection_instances. Similarly, the booking agent ($BA_{ci}$) 268 receives a message that results in the $BA_{ci}$ 268 taking responsibility for crediting the accounts receivable 272 of the connection_instance (network) owner, based on data and/or other information for which the $CA_{ci}$ 244 takes responsibility. These messages are identified as follows:

15) debit (session_id, connection_instance_request_connection_user_booking, amount);
15') debit (session_id, connection_instance_request_connection_user_booking, amount);
16) credit (session_id, connection_instance_request_connection_provider_booking, amount); and
16') credit (session_id, connection_instance_request_connection_provider_booking, amount).

As with the previous description given in connection with the general example of FIGS. 3A–3E, messages are sent to agents, along the paths identified in FIG. 4D, related to accomplishing the necessary functions and to generating further messages and sending them to agents in the connection, service instance and service layers directed to the release of the network connections, the release of the service instance and the release of the service, together with information and data that enables the connection (communication or other service related network connection that was required to deliver the movie), service instance (delivery of the movie) and service (video on demand) to be charged and booked using appropriate agents and agent systems, including an accounts receivable 276 associated with the provider or server 228 for the service, service instant and "static" connections related to the delivery of the movie. These messages are defined as:

16.7) connection_instance_released (session_id);
16.7') connection_instance_released (session_id);
16.8) connection_release (session_id);
16.8') connection_release (session_id);
16.9) charge_transaction (session_id, connection_resources);
16.9') charge_transaction (session_id, connection_resources);
17) connection_released (session_id);
17') connection_released (session_id);
18) service instance_released (session_id, service_instance_resources);
19) charge_transaction (session_id, service_instance_resources);
20) debit (session_id, service_instance_request_service_instance_user_booking, amount);
21) credit (session_id, service_instance_request_service_instance_user_booking, amount);
22) service_released (session_id);
23) service_released (session_id, service_resources) where the informational element and information/data related thereto for service resources is optional);
23.5) charge_transaction (session_id, service_resources); and
24) service_released (session_id).

In view of the foregoing example, it should be understood that the network systems, such as the set top box 200, and the agent systems that accomplish the functions for which the identified agents take responsibility, can be replaced so that multi-vendor products can be utilized. For example, the network system identified as the set top box 200 can be replaced by another network system that provides the same function or functions, which is available from one or more other network system vendors. In achieving such a replacement or substitution, it is necessary that such a set top box or equivalent system be configured to permit it to communicate with the appropriate agents. Similarly, a new service could be provided that requires a different server and one or more network systems different from the set top box 200. In such a case, the new network system required by the new service can be easily made to communicate with the agents using the message format and protocol required by the agents. That is, for any such new service, it is not necessary to design and vertically integrate the service, service instance and connection support functions with the new service, since the agents of the agent interface assume that responsibility.

Figure 5:
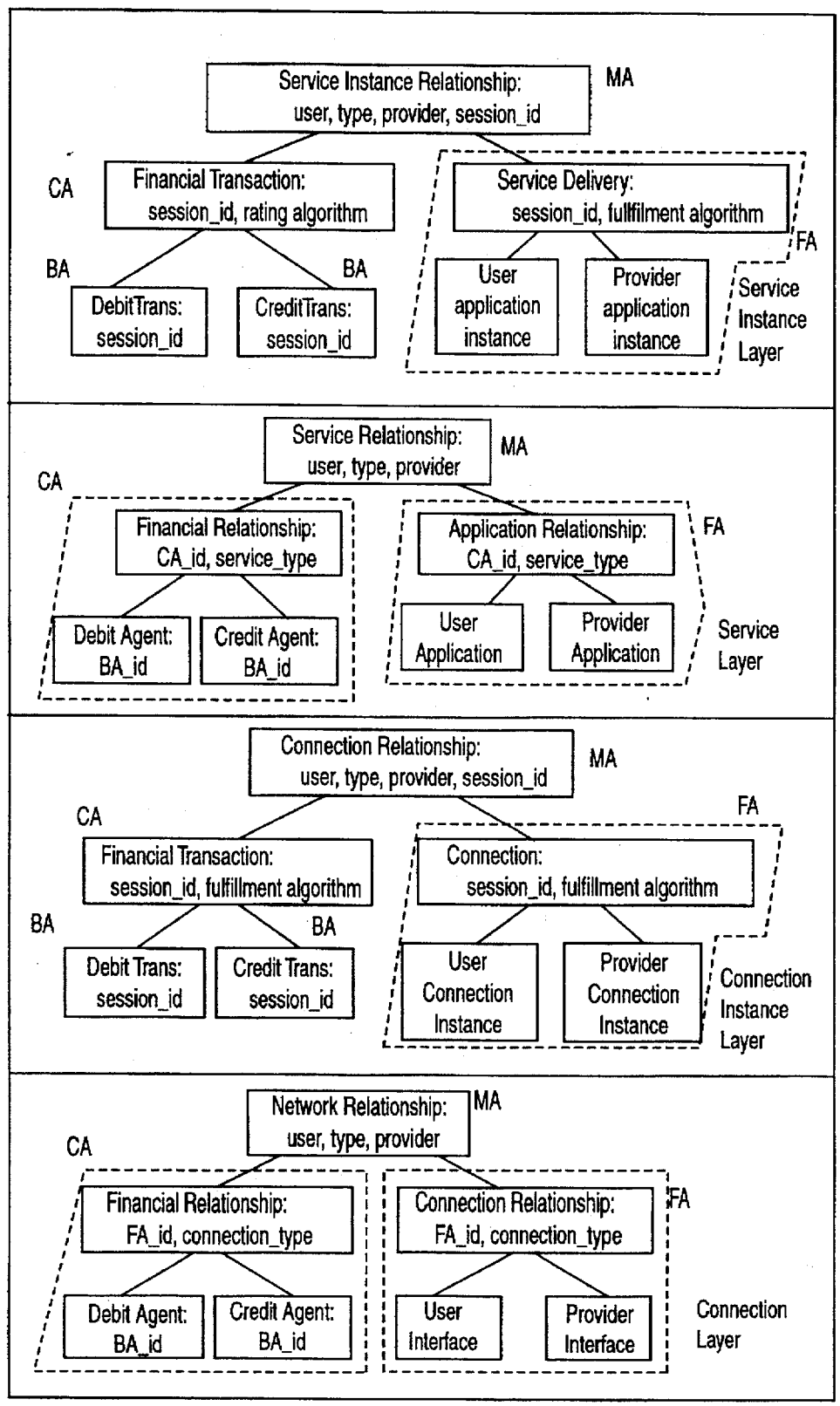
FIG. 5 schematically illustrates information and/or data received in messages by agents associated with the four layers of the network.

With reference to FIG. 5, a further illustration is provided that summarizes certain information that is required by the agents of the four network layers, as applied to billing functions. In that regard, for each of the four layers, an information model is presented that identifies information/data required by these different agents. With respect to the service instance layer, the management agent (MA) receives information and/or data directed to the service instance relationship including the identity of the service instance user, the type of service, the provider of the service instance and a current description of the particular service instance, such as the movie selected using the video on demand service. The fulfillment agent (FA) of the service instance layer requires information related to the delivery of the service including the current session that describes the service instance to be provided, such as the particular movie to be delivered. The information/data required by this agent also includes the algorithm or rules necessary to accomplish the fulfillment. Additional information to the fulfillment agent in the service instance layer includes the identities of the user and the provider for the particular application instance. The charging agent (CA) of the service instance layer receives financial transaction data and information including the current session describing the service instance and a rating algorithm for use in charging for the service instance. Booking agents (BA) receive information related to debiting and crediting appropriate accounts including a description of the current session.

In the service layer, the management agent receives information related to the service relationship in the form of the identity of the user of the service, the identity of the provider of the service and the type of service (e.g., movie on demand). The fulfillment agent receives information directed to the application relationships, such as the relationship between a customer and a provider of movies on demand, including the identity of the fulfillment agent that takes responsibility for functions in delivery of the service and the type of service. The information also includes the identities of the user and provider of the service. The charging agent receives information related to the financial relationship for the service including the identity of the charging agent to be used and the type of service being provided. Booking agents receive information for debiting and crediting the proper accounts including a description of the current session.

The connection instance layer also has agents that require information and messages similar to those required by agents in the service instance layer, with differences being based on the connection_instance relationship. Likewise, the connection layer has agents that require information and messages similar to that required by the agents in the service layer, with the difference being based on a network connection relationship, rather than a service relationship.

Figure 6A:
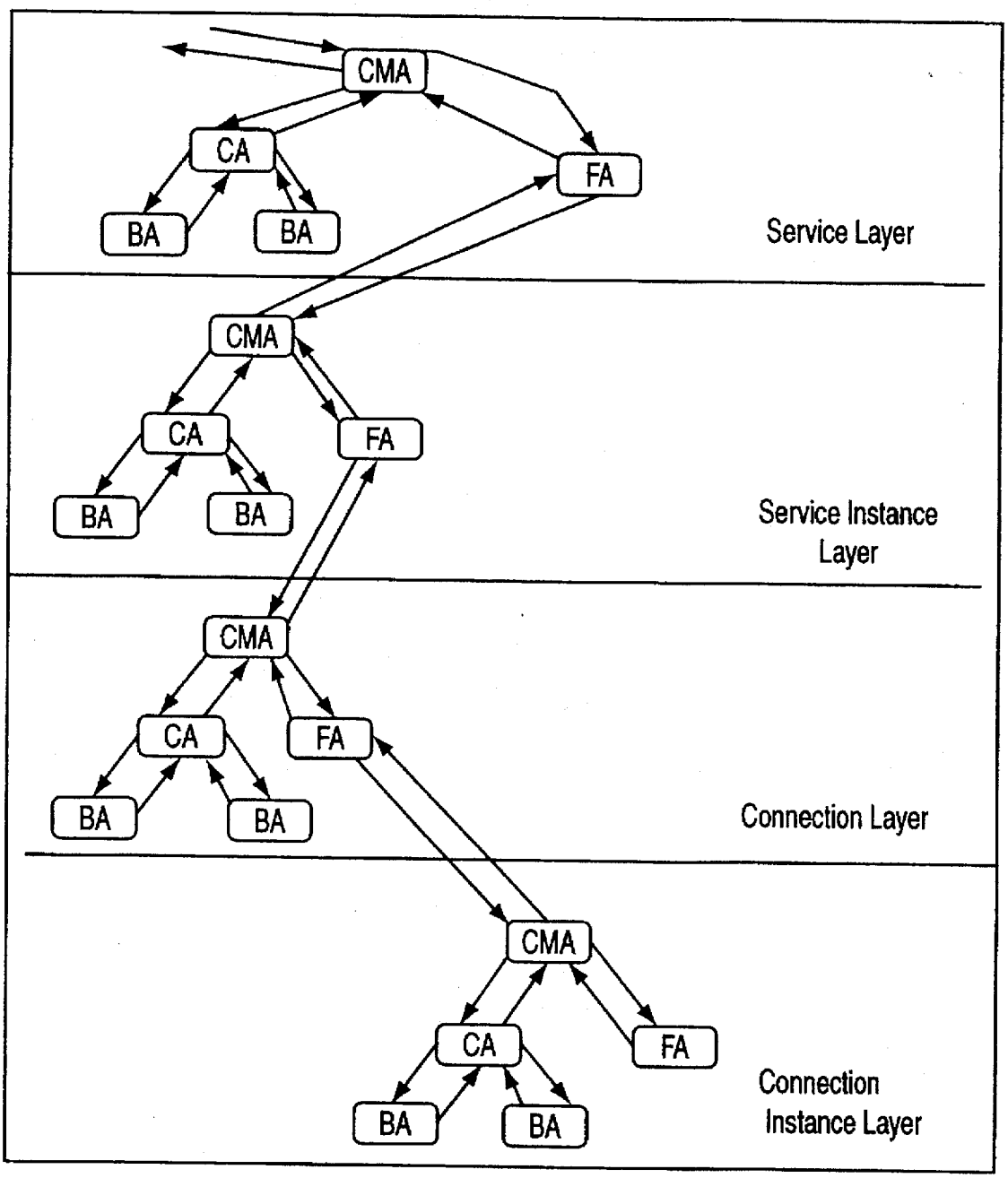
FIGS. 6A–6D schematically illustrate embodiments in which a single agent may assume responsibility for a number of functions that, in other embodiments, might be handled by a plurality of agents.
Figure 6B:
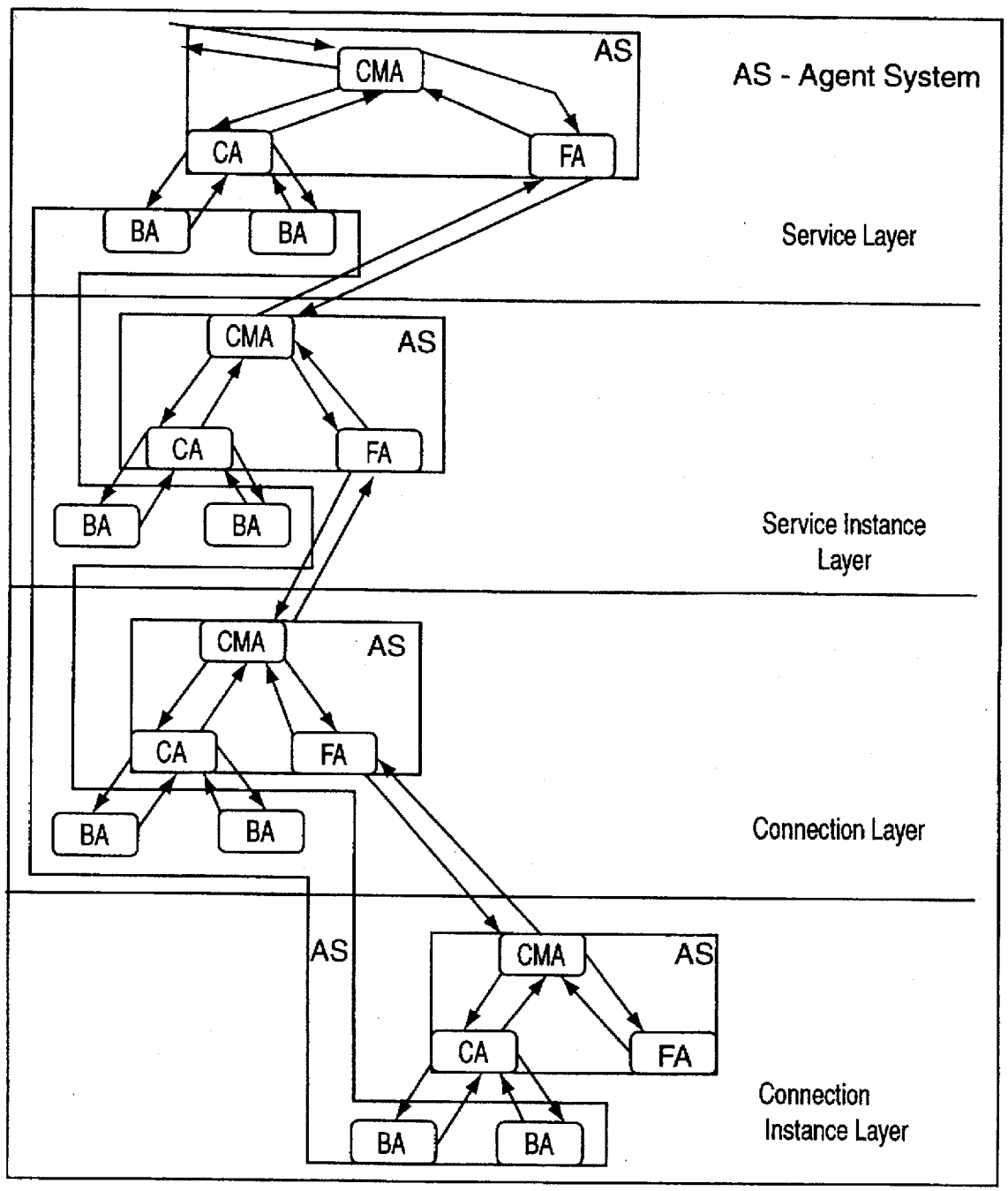
Figure 6C:
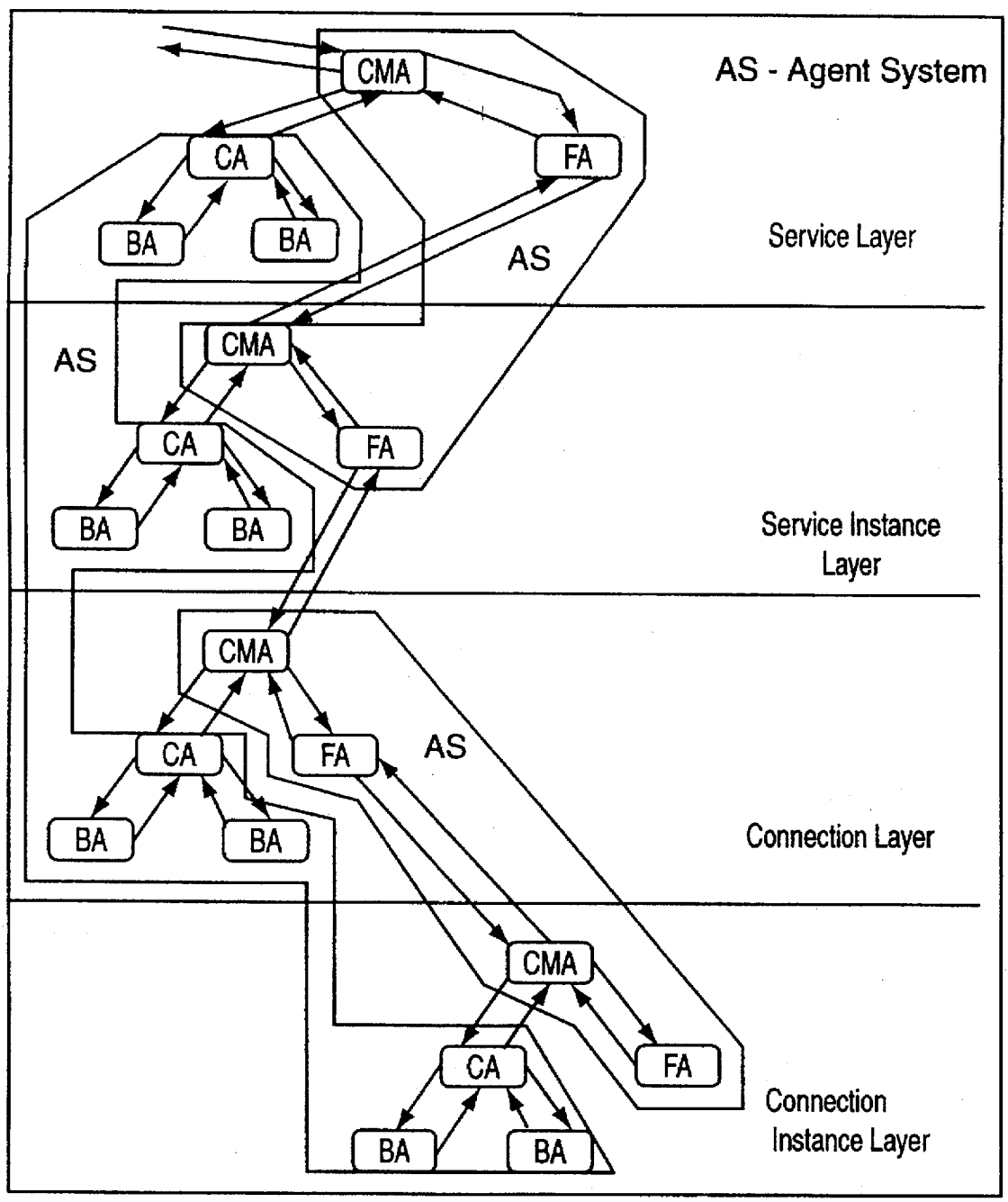
Figure 6D:
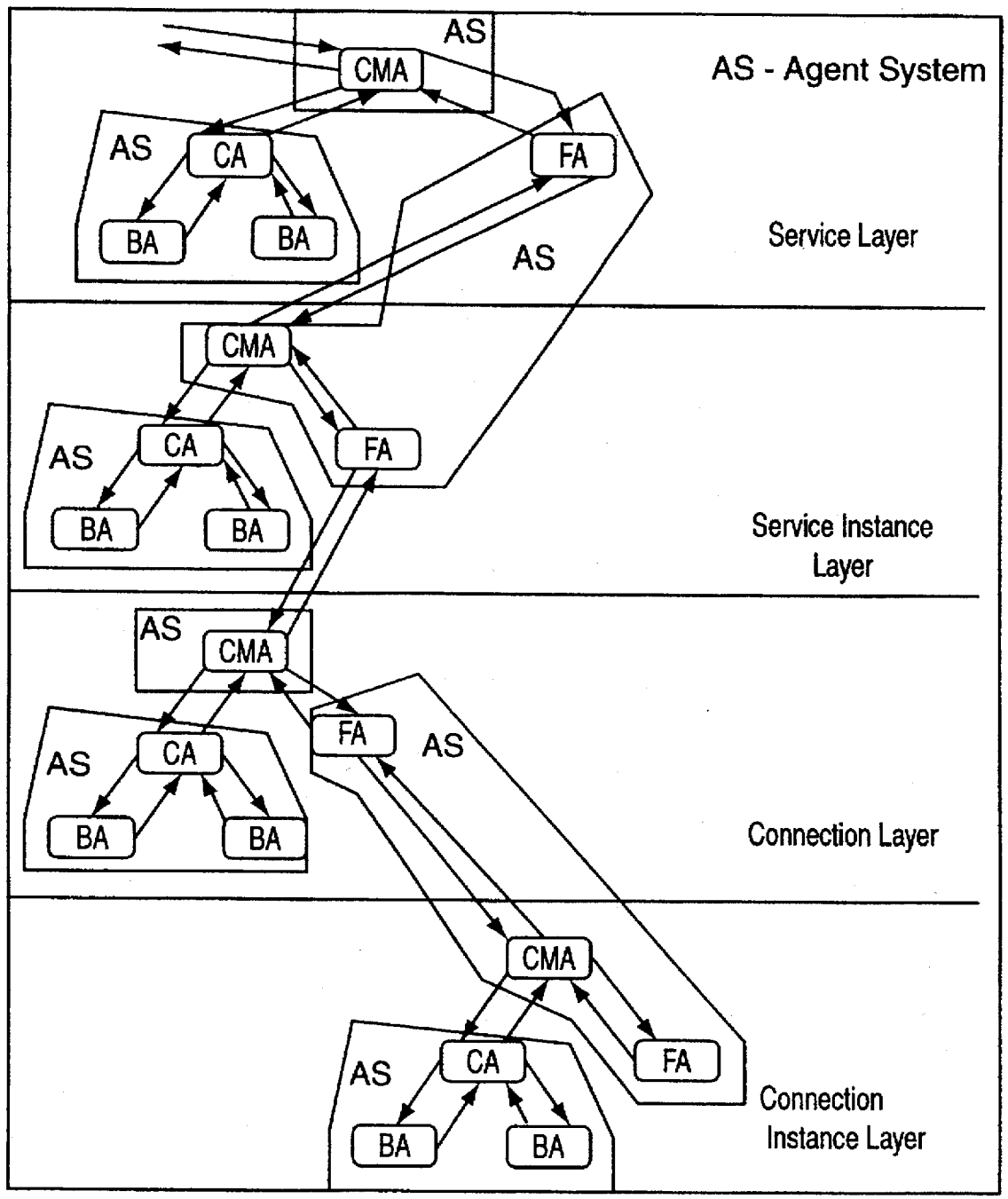

With reference to FIG. 6A–6D, a further important aspect of the present invention is illustrated. As seen in FIG. 6A, a representation of certain agents for the service, service instance, connection_instance and connection layers are identified. It should be appreciated that the functions for which each of these agents take responsibility could be accomplished by fewer agents. That is, two or more of the agents in one or more of the layers could be categorized as constituting a single agent whereby a number of functions, which could involve a plurality of agents, would instead be the responsibility of a single agent. In such a case, a single communication, rather than multiple communications, to the agent interface would result in the accomplishment of all of the necessary functions through the responsibility of the single agent. This feature is illustrated in the examples of FIGS. 6B–6D.

Referring to FIG. 6B, for each of the four layers, the management, fulfillment and charging agents are grouped to signify that a single agent communicating with an agent system could be responsible for all of the functions represented by these grouped agents. FIG. 6B also illustrates that a single agent could represent all of the booking agents for each of the service, service instance, connection_instance and connection layers. Hence, such a single agent takes responsibility for accomplishing the booking functions, even though different layers for booking are identified. Referring to FIG. 6C, another possible grouping of agents to represent a single agent is illustrated that indicates that the responsibility for all charging and booking functions across all four layers is assumed by a single agent. FIG. 6C also illustrates that a single agent could be responsible for management and fulfillment functions for two different layers, i.e., service/service instance layers and connection/connection instance layers. Referring to FIG. 6D, a further example of groupings to define a single agent that might be responsible for multiple functions, previously assigned to more than one agent, is illustrated. In this example, the charging and booking agents for each layer are grouped to define a single agent that takes responsibility for such functions. In addition, an illustration is presented of a single agent taking responsibility for fulfillment functions where two layers are involved (service/service instance layers and connection/connection instance layers) and, in each case, one management agent (MA) is also part of this grouping, i.e., the MA of the service instance layer or the MA of the connection instance layer.

It should also be understood from the foregoing that the operations gateway of the present invention can also be utilized specifically for only supporting financial transactions. The agents of the operations gateway that would be included are equivalent to those previously described in conjunction with the network layers. In providing billing functions for a variety of providers of services, as well as goods, the management, fulfillment, charging and booking agents would be utilized together with the necessary agent systems and other systems required for the particular billing application(s). By way of example, a department store or other merchandiser would incorporate the operations gateway into its billing system and thereby enable it to utilize interchangeable modules, components or other equipment, including hardware and software, as its "agent systems" and/or "network systems" and would not be limited to a single, vertically integrated financial transactions system. New and different systems that support the financial transactions could be integrated into the billing system because of the utilization of the operations gateway.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments discussed hereinabove are further intended to explain the best mode known of practicing the invention and to enable others skilled in the art to utilize the invention in such, or in other embodiments, and with the various modifications required by their particular application or uses of the invention. It is intended that the appended claims be construed to include alternative embodiments to the extent permitted by the prior art.

What is claimed is:

1. A method involving the supplying of services, comprising:

defining for analysis a network including four layers, including:

a service layer that defines an information model for management of a number of services available from a plurality of providers to a plurality of users;

a service instance layer that defines an information model for management of a particular service to a user and requests network connections to provide said particular service;

a connection layer that defines an information model for management of physical and logical devices and their interconnections within said network; and a connection instance layer that defines an information model for management of connections in said network that are required to provide available services;

identifying functions to be accomplished using agent systems associated with said layers, said functions including managing a relationship between a user and a provider that is appropriate for one or more of said layers, fulfilling a capability to be provided to a user that is appropriate for one or more of said layers, determining an amount to be billed for a specific use of a capability that is appropriate for one or more of said layers and crediting or debiting an account that is appropriate for one or more of said layers;

associating with said functions a plurality of mechanized agents including a first agent having a predetermined function that is different from functions of each of said other of plurality of agents;

analyzing using said layers and said agents, in connection with making decisions related to arrangement and implementation of said agent systems, said hardware, said software and said support systems, said analyzing step further including:

allowing for said support systems to be technology and service application independent;

permitting interoperability between at least two of said hardware, software and support systems that are involved with supporting different service applications;

permitting interoperability between said hardware and said software supplied by different vendors;

standardizing data and data formats necessary for initiating and implementing said functions;

reducing a number of said hardware, said software and said support systems that operation support personnel need to be trained upon; and permitting coordination and cooperation among service and network providers for delivery of new services and new technology; and implementing the supplying of a plurality of services using at least one of said agent systems, said hardware, said software and said support systems, said implementing step including formulating messages that include informational elements related to: a service request, a service instance request, a connection request and a connection instance request and in which each one of said requests includes at least one of the following: user booking data describing a booking to be used for a user; provider booking data describing a booking to be used for a provider; fulfillment agent data describing a fulfillment agent to be used for fulfilling said request; charging agent data describing a charging agent used in charging an amount associated with said request; description data describing said request; and accounting rules used in charging related to said request.

2. A method for facilitating the supplying of services using a network in which there are a number of service providers and in which there are a plurality of mechanized agents to take responsibility for the accomplishment of desired functions, a plurality of mechanized agent systems for accomplishing the functions initiated by the mechanized agents and with a plurality of messages being received by the mechanized agents in connection with providing the services, the method comprising:

initiating a request to a management agent using a control channel for a first service instance to be provided to a first user by a first service provider, said management agent being responsible for managing the relationship between the first user and the first service provider involving the delivery of said first service instance;

invoking a fulfillment agent a first time using said management agent and in which said fulfillment agent receives a first message that includes informational elements related to an identity of said first user and a description of the first service instance, said fulfillment agent being responsible for operations to be performed by one or more agent systems including at least a first function related to delivery of said first service instance to the first user;

invoking a charging agent a first time using said management agent and in which said charging agent takes responsibility for charging for said first service instance and in which said charging agent receives a second message that includes informational elements related to the identity of the first user and a description of said first service instance, and in which said charging agent delays complete charging for said first service instance until after said first service instance is terminated;

requesting a first component service instance using said fulfillment agent, and in which said first component service instance is involved with a second function, different from said first function, and with both of said first and second functions being needed to provide said first service instance to the first user;

providing said first service instance to the first user over a first service delivery channel in said network, different from said control channel, after said requesting of said first component service instance and after said invoking of said fulfillment agent and said charging agent said first time;

generating a termination request for terminating said first service instance;

invoking said fulfillment agent a second time after said generating step in connection with the termination of said first service instance and in which said fulfillment agent receives a third message that includes informational elements related to the identity of the first user and a description of said first service instance and in which said fulfillment agent takes responsibility for operations related to termination of said providing of said first service instance;

invoking said charging agent a second time after said step of generating said termination request for terminating said first service instance using one of said management agent and said fulfillment agent and in which said charging agent receives a fourth message that includes informational elements related to data based on the amount of use by the first user of said first service instance and charging parameters for use in determining charges for said first service instance including said providing thereof;

discontinuing use of said first service delivery channel in connection with said first service instance;

initiating a request to said management agent for a second service instance to be provided to a second user by the first service provider;

invoking said fulfillment agent a third time using said management agent and in which said fulfillment agent receives a fifth message that includes informational elements related to the identity of the second user and a description of said second service instance, said fulfillment agent being responsible for operations to be performed by one of more agent systems, including at least a first function, related to delivery of said second service instance to the second user;

invoking said charging agent a third time using said management agent and in which said charging agent receives a sixth message that includes informational elements related to the identity of the second user and a description of said second service instance;

requesting a second component service instance, different from said first component service instance, using said fulfillment agent and in which said second component service instance is involved with providing a second function, different from said first function, and with both of said first and second functions being needed to provide said second service instance to the second user by the first provider;

providing said second service instance to the second user after said requesting of said second component service instance and after said invoking of said fulfillment agent and said charging agent said third time;

generating a termination request for terminating said second service instance;

invoking said fulfillment agent a fourth time after said generating step in connection with termination of said second service instance and in which said fulfillment agent receives a seventh message that includes informational elements related to the identity of the second user and a description of the second service instance and in which said fulfillment agent takes responsibility for operations related to termination of said providing of said second service instance;

invoking said charging agent a fourth time after said step of generating said termination request for terminating said second service instance using one of said management agent and said fulfillment agent and in which said charging agent receives a eighth message that includes informational elements related to the identity of the second user, data based on the amount of use by the second user of said second service instance and charging parameters for use in determining charges for delivery of said second service instance and in which said charging agent is responsible for determining charges for said second service instance including said providing thereof;

wherein, for each of said first and second service instances, charging for said first and second service instances is pre-established so that the first and second users are not involved in negotiating charging terms with the first service provider in order to conduct said providing of said first and second service instances;

wherein said charging agent, together with its operational relationship involving said management agent and said fulfillment agent, are known and pre-established for charging for said first and second service instances before said first and second services instances are initiated by the first and second users, respectively;

wherein each of said management agent, said fulfillment agent and said charging agent is a mechanized agent and each communicates with a different one of said plurality of mechanized agent systems, said plurality including a first agent system communicating with said charging agent and in which said first agent system is modular wherein, when said first agent system is replaced by a second agent system, said first charging agent communicates the same informational elements to said second agent system as said first charging agent communicated with said first agent system;

wherein each of said management agent, said fulfillment agent and said charging agent is responsible for a predetermined function that is different from each predetermined function of each of the other of said management agent, said fulfillment agent and said charging agent; and wherein each of said informational elements of each of said one through eighth messages is provided in a predetermined order and format acceptable to said agents and in which each of said management, fulfillment and charging agents initiates a predetermined response depending on content of said messages.

3. The method, as claimed in claim 2, wherein:

at least said fulfillment agent is selected from a plurality of fulfillment agents using said management agent.

4. The method, as claimed in claim 2, wherein:

at least one of said one through eighth messages includes a time factor related to one of accessing and updating using one or more of said agent systems.

5. A method, as claimed in claim 2 wherein:

said network comprises network support systems that include:
   a system for handling financial tasks including changing and booking functions;
   a network management system for managing functions to be accomplished by said network;
   a service management system for coordinating and organizing said plurality of services that are available in said network; and
   a user support system that handles tasks associated with supporting customers or other users of said network.

6. A method, as claimed in claim 2, wherein:

said charging agent is used in providing a ninth message that is sent to a booking agent for taking responsibility in connection with crediting or debiting an account related to said first service instance.

7. A method, as claimed in claim 6 wherein:

said ninth message includes informational elements related to booking data describing a booking to be used for the first service user and first service provider booking data describing a booking to be used for the first service provider.

8. A method, as claimed in claim 2, further including:

introducing a new service requiring at least said management agent for providing said new service; and using said management agent in providing said new service.

9. A method, as claimed in claim 8, further including:

providing a new agent system, different from said plurality of agent systems, when said new service is introduced.

10. A method, as claimed in claim 2, wherein:

said plurality of agent systems includes a first agent system that accomplishes a plurality of functions associated with said first service instance.

11. A method, as claimed in claim 10, wherein:

said plurality of functions relate to charging and booking functions.

12. A method, as claimed in claim 10, wherein:

said plurality of functions relate to managing and fulfilling functions.

13. A method, as claimed in claim 10, wherein:

said plurality of functions relate to managing, fulfilling and charging functions.

14. A method, as claimed in claim 2, wherein:

said management agent takes responsibility for accomplishing functions related to: managing fulfillment of said first service instance, managing charging for said first service instance and managing booking of charges for said first service instance.

15. A method, as claimed in claim 2, wherein:

said management agent is used in selecting said fulfillment agent.

16. A method, as claimed in claim 2, wherein:

said charging agent is involved in sending a message to a booking agent for crediting or debiting an amount to an account.

17. A method, as claimed in claim 2, wherein:

said step of requesting said first component service instance includes requesting said first component service instance from a second service provider.

18. A method, as claimed in claim 2, wherein:

said step of requesting said first component service instance includes requesting a supplemental component service instance different from said first component service instance and in which said supplemental component service instance is involved with a third function, different from said first and second functions, and with each of said first, second and third functions being needed to provide said first service instance to the first user and in which at least one of said first component service instance and said supplemental component service instance is provided using a second service provider different from the first service provider.

19. A method, as claimed in claim 2, wherein:

said step of initiating a request for said first service instance includes invoking a further agent, different from said management, fulfillment and charging agents and in which said further agent is used in initiating said request to said management agent.

20. An architecture for facilitating the providing of services using a network, comprising:

a network for providing available services to users, said network including support systems for supporting the providing of the services, said support systems having a plurality of agent systems and said network having a plurality of network systems including hardware and software required for proper network operation, said network further including a control channel for carrying a request related to a service instance to be provided to a user and a service providing channel, different from said control channel, through which a service instance is to be delivered; and an operations gateway in operative communication with said network including said network systems and said agent systems, said operations gateway including a plurality of agents, said agents constituting an interface that takes responsibility for the accomplishment of one or more functions using said agent systems, said agents receiving messages from said agent systems, said network systems and others of said plurality of said agents, each of said messages including informational elements useful in providing the services;

wherein said plurality of agents includes a management agent, a fulfillment agent and a charging agent, said management agent being responsible for managing the relationship between service users and service providers including a first user, a second user and a first service provider, the fulfillment agent being responsible for operations to be performed by one or more agent systems including at least a first function related to delivery of said first service instance to the first user and a first function related to delivery of said second service instance, said charging agent taking responsibility for said first service instance and said second service instance and in which said charging agent delays complete charging for each of said first and second service instances until after each of said first and second service instances, respectively, is terminated;

first means for providing a first component service instance in which said first component service instance involves using said fulfillment agent and said first component service instance has a second function in connection with said first service instance, which is different from said first function, and with both of said first and second functions being needed to provide said first service instance to the first user;

second means for providing a second component service instance in which said second component service instance involves using said fulfillment agent and said second component service instance has a second function in connection with said second service instance, which is different from said first function, and with both of said first and second functions being needed to provide said second service instance to the second user;

wherein said plurality of messages include:

a first message received by said fulfillment agent that includes informational elements related to an identity of the first user and a description of said first service instance and in which said first message is received using said management agent before completion of said first service instance;

a second message received by said charging agent that includes informational elements related to the identity of the first user and a description of said first service instance and in which said second message is received before completion of said first service instance;

a third message received by said fulfillment agent that includes informational elements related to the identity of the first user and a description of said first service instance and in which said third message is received in connection with termination of said first service instance;

a fourth message received by said charging agent that includes informational elements related to data based on the amount of use by the first user of said first service instance and charging parameters for use in determining charges for said first service instance including providing thereof and in which said fourth message is received in connection with termination of said first service instance;

a fifth message received by said fulfillment agent that includes informational elements related to an identity of the second user and a description of said second service instance and in which said fifth message is received using said management agent before completion of said second service instance;

a sixth message received by said charging agent that includes informational elements related to the identity of the second user and a description of said second service instance and in which said sixth message is received before completion of said second service instance;
a seventh message received by said fulfillment agent that includes informational elements related to the identity of the second user and a description of said second service instance and in which said seventh message is received in connection with termination of said second service instance; and
an eighth message received by said charging agent that includes informational elements related to data base based on use by the second user of said second service instance and charging parameters for use in determining charges for said second service instance and in which said seventh message is received in connection with termination of said second service instance;
wherein said charging agent, together with its operational relationship with said management agent and said fulfillment agent, are known and pre-established for charging for said first and second service instances before said first and second service instances are initiated by the first and second users, respectively;
wherein each of said management agent, said fulfillment agent and said charging agent is a mechanized agent and each communicates with a different one of said plurality of mechanized agent systems, said plurality including a first agent system communicating with said charging agent and in which said first agent system is modular wherein, when said first agent system is replaced by a second agent system, said charging agent communicates the same informational elements to said second agent system as said charging agent communicated with said first agent system;
wherein each of said management agent, said fulfillment agent and said charging agent is responsible for a predetermined function that is different from each predetermined function of each of the other of said management agent, said fulfillment agent and said charging agent; and
wherein each of said informational elements of each of said one through eighth messages is provided in a predetermined order and format acceptable to said agent that receives said messages and in which each of said management, fulfillment and charging agents initiates a predetermined response depending upon content of said messages.

21. An architecture, as claimed in claim 20, wherein:

said network includes at least one of the following: a personal communications network for providing desired communications among a plurality of users linked together by said network; a full service network for providing said plurality of said available services to users on said network; and a telephone network for providing voice communications services to users of said network.

22. An architecture, as claimed in claim 20, wherein:

said support systems include at least one of the following: a system for handling financial tasks, including charging and booking functions; a network management system for managing and identifying network systems of said network; a service management system for organizing and coordinating said plurality of available services for users of said network; and a user support system for supporting customer requirements and inquiries related to use of said network.

23. An architecture, as claimed in claim 20, wherein:

said plurality of agents further include a booking agent being responsive to a message from said charging agent.

24. An architecture, as claimed in claim 20, further including:

a new agent system using said agent interface that is provided based on a new service to be delivered by said network and in which said new agent system accomplishes functions communicated through said management agent in providing said new service.

25. An architecture, as claimed in claim 20, wherein:

said fulfillment agent is selected from among a plurality of fulfillment agents using said management agent.

26. An architecture, as claimed in claim 20, wherein:

said network includes a connection layer that defines an information model for management of physical and logical devices and their interconnections within said network and a connection instance layer that defines an information model for management of particular connections in said network that are required to provide available services.

27. An architecture, as claimed in claim 26, wherein:

a ninth message is received by an agent associated with one of said connection layer and said connection instance layer.

28. An architecture, as claimed in claim 20, wherein:

said plurality of agents includes a booking agent that receives a message from said charging agent, with said booking agent taking responsibility for debiting or crediting an account of the first user in connection with said first service instance.

29. An architecture, as claimed in claim 20, wherein:

said plurality of agents includes a second management agent different from said management agent and in which said second management agent is involved in said request to said management agent for said first and second service instances.

30. An architecture, as claimed in claim 20, further including:

third means for providing a third component service instance in response to a message from said fulfillment agent and in which said third component service instance is involved with providing a third function, different from said first and second functions, and with each of said first, second and third functions being needed to provide said first service instance to the first user.

* * * * *